United States Patent [19]
Imasaki et al.

[11] Patent Number: 5,983,210
[45] Date of Patent: Nov. 9, 1999

[54] DATA PROCESSING SYSTEM, SYSTEM-BUILD SYSTEM, AND SYSTEM-BUILD METHOD

[75] Inventors: Naoki Imasaki, Urayasu; Hideyuki Aisu, Kawasaki; Satoshi Sekine; Makoto Kano, both of Urayasu; Kyoko Makino, Yokohama, all of Japan

[73] Assignee: Kabushiki Kaisha Toshiba, Kawasaki, Japan

[21] Appl. No.: 08/772,297

[22] Filed: Dec. 23, 1996

[30] Foreign Application Priority Data

Dec. 27, 1995 [JP] Japan ................................ 7-341459
May 31, 1996 [JP] Japan ................................ 8-138487

[51] Int. Cl.⁶ .................................................. G06F 15/18
[52] U.S. Cl. .............................. 706/15; 706/16; 706/25; 706/44
[58] Field of Search .................................. 395/21, 22, 23, 395/24, 27, 11; 706/15–17, 25–27, 41, 43, 10, 44

[56] References Cited

U.S. PATENT DOCUMENTS

| | | | |
|---|---|---|---|
| 5,095,443 | 3/1992 | Watanabe ................................ | 706/10 |
| 5,283,855 | 2/1994 | Motomura et al. ..................... | 706/25 |
| 5,319,587 | 6/1994 | White ...................................... | 708/522 |
| 5,485,548 | 1/1996 | Oteki et al. ............................. | 706/25 |
| 5,524,178 | 6/1996 | Yokono .................................. | 706/25 |
| 5,613,044 | 3/1997 | Pechanek et al. ...................... | 706/41 |
| 5,619,617 | 4/1997 | Furuta et al. ........................... | 706/25 |
| 5,627,944 | 5/1997 | Fujimoto et al. ....................... | 706/41 |

FOREIGN PATENT DOCUMENTS

WO 91/02322  2/1991  WIPO .............................. G06F 15/80

OTHER PUBLICATIONS

J. Hemmskerk, et al., "The BSP400: A Modular Neurocomputer," 2407 Microprocessors and Microsystems, vol. 18, No. 2, Mar. 1994, pp. 67–78.

D. Fausett, "Strictly Local Backpropagation," International Joint Conference on Neural Networks, vol. 3, No. 17, Jun. 17–21, 1990, pp. 125–130.

M. Duranton, et al., "Learning on VLSI: A General–Purpose Digital Neurochip," 780 Philips Journal of Research, vol. 45, No. 1, Jul. 15, 1990, pp. 1–16.

M. Amin, et al., "Customizing Parallel Formulations of Backpropagation Learning Algorithm to Neural Network Architectures: A Summary of Results," Proceedings of the International Conference on Tools with Artificia Intelligence, No. 6, Nov. 6–9, 1994, pp. 181–189.

J–S. R. Jang, "Rule Extraction Using Generalized Neural Networks", Proceedings of Third IFSA Congress, pp. 82–85, (Artificial Intelligence), 1991.

S. Tano et al., "Fuzzy Inference Software—FINEST: Overview and Application Examples", Proceedings of FUZZ–IEEE '95, pp. 1051–1056, 1995.

R. N. Taylor, "Structural Testing of Concurrent Programs", IEEE Transactions On Software Engineering, vol. 18, No. 3, pp. 206–215, Mar. 1992.

Pai, Miao Li. "A hierarchical nerual network approach for an intelligent telecommunication service provisioning system", Proceedings of the First Singapore Int'l Conf. on Intelligent Systems, pp. 421–424, Oct. 1992.

Primary Examiner—Robert W. Downs
Assistant Examiner—Jason W. Rhodes
Attorney, Agent, or Firm—Finnegan, Henderson, Farabow, Garrett & Dunner, L.L.P.

[57] ABSTRACT

Each of a plurality of units 2 has the learning section 9 which updates the parameters PRM and performs learning. The learning means 9 modifies the parameters PRM based on the error signal OS' propagated from one unit to another. To build a system consisting of such units 2, the user uses the GUI or some other method to select the units 2 as well as the signal paths for connecting the units via the user interface, displays the system configuration status, and adjusts the functions of units 2. Therefore, an easy-to-build data processing system and a system-build system and method used to build such a system can be provided.

3 Claims, 35 Drawing Sheets

Fig. 4
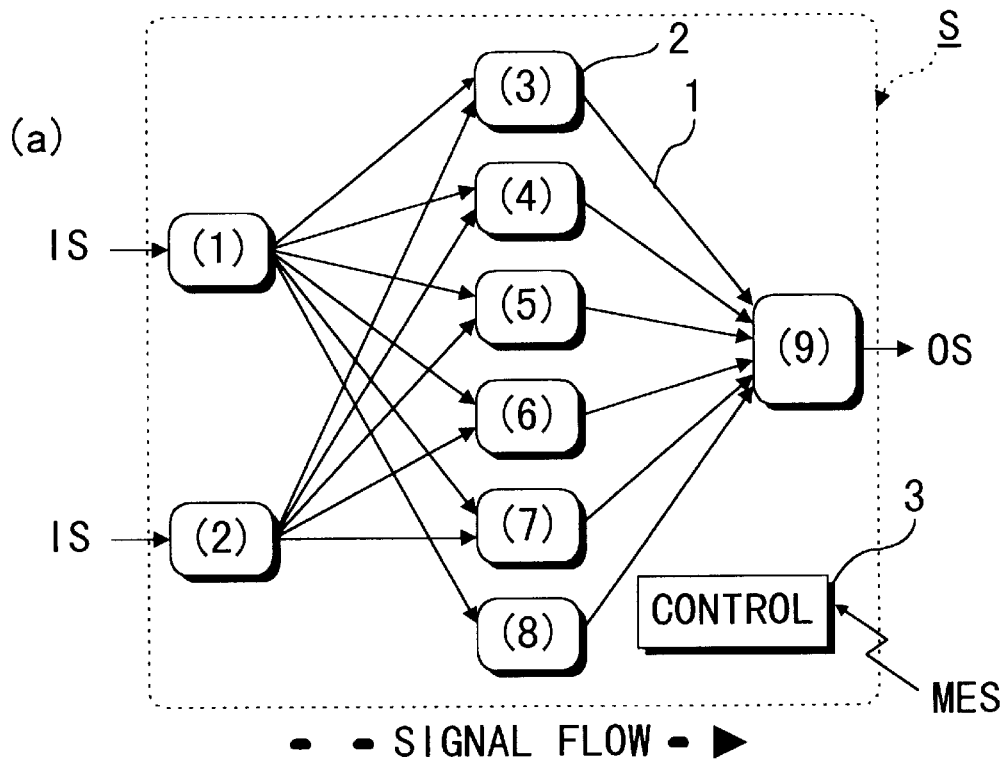
(a)
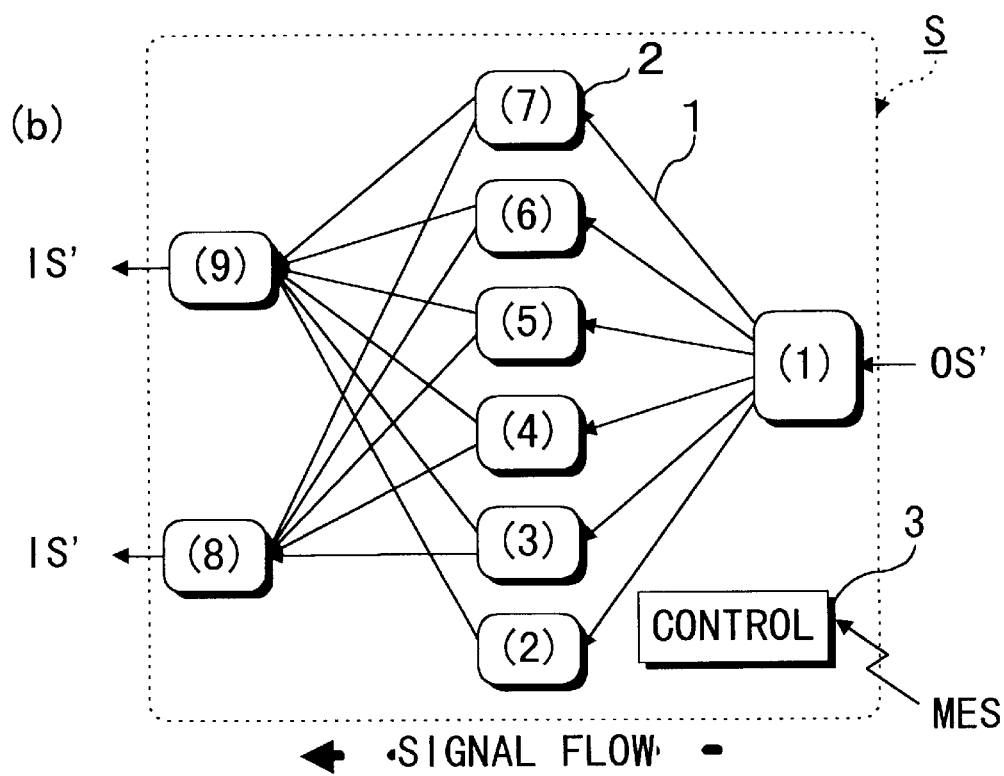
(b)

Fig.20

```
Port No=3;              /*Total No.of I/O ports*/
Input={x1, x2};
Output={y};

Item No=9;              /*Total No.of items*/
Link No=21;             /*Total No.of links*/

/*Item information*/
Item x1_is{
        Input Port={in};
        Output Port={out1, out2};
}
Item x2_is{
        Input Port={in};
        Output Port={out1, out2, out3};
}
Item Rule{
        Input Port={in1, in2};
        Output Port={out1, out2, out3};
}

/*Link information*/
Link1{
        From=x1;
        To=x1_is.in;
}
        .
        .
Link3{
        From=x1_is.out1;
        To=Rule1.in1;
}
        .
        .
Link4{
        From=x1_is.out1;
        To=Rule2.in1;
}
        .
        .
Link21{
        From=y_is.out;
        To=y;
}
```

Fig.21
EXAMPLE OF CONNECTION INFORMATION TABLE

| LINK NO. | FROM | TO |
| --- | --- | --- |
| 1 | Root.x1 | x1_is.in |
| 2 | Root.x2 | x2_is.in |
| 3 | x1_is.out1 | Rule1.in1 |
| 4 | x1_is.out1 | Rule2.in1 |
| 5 | x1_is.out1 | Rule3.in1 |
| 6 | x1_is.out2 | Rule4.in1 |
| 7 | x1_is.out2 | Rule5.in1 |
| 8 | x1_is.out2 | Rule6.in1 |
| 9 | x1_is.out1 | Rule1.in1 |
| 10 | x1_is.out2 | Rule4.in1 |
| ⋮ | ⋮ | ⋮ |
| 20 | Rule6.out | y_is.in5 |
| 21 | y1_is.out | Root.y |

| ITEM NO. | ITEM | INPUT PORT | OUTPUT PORT |
| --- | --- | --- | --- |
| 0 | Root | x1, x2 | y |
| 1 | x1_is | in | out1, out2 |
| 2 | x2_is | in | out1, out2, out3 |
| ⋮ | ⋮ | ⋮ | ⋮ |
| 8 | Rule6 | in1, in2 | out |
| 9 | y_is | in1, in2, ⋯, in4 | out |

Fig.26

MEMBERSHIP FUNCTION INITIALIZATION

| LABEL | TYPE | a | b | c | d | LEARNING PARAMETER |
|---|---|---|---|---|---|---|
| LEFT | LOT | 1 | -25[m] | 0[m] | — | b |
| CENTER | TRI | 1 | -25[m] | 0[m] | 25[m] | b, d |
| RIGHT | ROT | 1 | 0[m] | 25[m] | — | c |
| NEAR | LOT | 1 | 10[m] | 20[m] | — | b, c |
| MIDDLE | TRI | 1 | 10[m] | 20[m] | 30[m] | b, c, d |
| FAR | ROT | 1 | 20[m] | 30[m] | — | b, c |
| LEFT-FRONT | REAL | -120[deg] | — | — | — | a |
| LEFT | REAL | -60[deg] | — | — | — | a |
| LEFT-BACK | REAL | -30[deg] | — | — | — | a |
| BACK | REAL | 0[deg] | — | — | — | |
| RIGHT-BACK | REAL | 30[deg] | — | — | — | a |
| RIGHT | REAL | 60[deg] | — | — | — | a |
| RIGHT-FRONT | REAL | 120[deg] | — | — | — | a |

Fig.31  MEMBERSHIP FUNCTION ADJUSTMENT RESULT

| LABEL | TYPE | a | b | c | d |
|---|---|---|---|---|---|
| LEFT | LOT | 1 | −9.043[m] | 0[m] | − |
| CENTER | TRI | 1 | −9.043[m] | 0[m] | 9.111[m] |
| RIGHT | ROT | 1 | 0[m] | 9.111[m] | − |
| NEAR | LOT | 1 | 11.153[m] | 11.227[m] | − |
| MIDDLE | TRI | 1 | 11.153[m] | 11.227[m] | 30.125[m] |
| FAR | ROT | 1 | 11.227[m] | 30.125[m] | − |
| LEFT-FRONT | REAL | −147.38[deg] | − | − | − |
| LEFT | REAL | −121.07[deg] | − | − | − |
| LEFT-BACK | REAL | −14.50[deg] | − | − | − |
| BACK | REAL | 0[deg] | − | − | − |
| RIGHT-BACK | REAL | 8.51[deg] | − | − | − |
| RIGHT | REAL | 123.62[deg] | − | − | − |
| RIGHT-FRONT | REAL | 150.15[deg] | − | − | − |

DATA PROCESSING SYSTEM, SYSTEM-BUILD SYSTEM, AND SYSTEM-BUILD METHOD

BACKGROUND OF THE INVENTION

1. Field of the Invention

This invention relates to an easy-to-build data processing system, a system for building such a data processing system, and its method.

2. Description of the Prior Art

In general, data processing systems (hereafter called systems) receive external signals, process them as the need arises according to the internal status, and output processing results. Some of these systems, called learning systems, adapt their internal status to external signals to produce desired input/output characteristics.

Such a learning system learns the correspondence between input data and output data. A typical learning system is a neural network. It is an engineering-based data processing system modeling after a network structure of a human brain. A neural network is used, for example, in data processing systems including control applications. It also finds applications in the software field.

FIG. 33 is a conceptual diagram showing an example of a neural network structure. As shown in this figure, a neutral network usually consists of a plurality of neuron-elements N (unit) connected in a plurality of stages. Typically, a load value, indicating the level of stimulus transmission speed, is assigned to each of the links (signal path) L connecting the elements. A function and its parameters are provided to specify how each element generates an output signal (response) upon receiving a combination of input signals (stimuli). In general, because an input signal sent to an element of a layer is represented as a multi-dimensional value with the number of dimensions being the number of output signals from the elements of the previous layer, a load value assigned to each link may be represented as the parameters of a function of an element which receives a multi-dimensional value.

Conventionally, this type of neural network is built as follows. For example, a CAD system, which uses the GUI (Graphical User Interface), is used to define a network; that is, the system is used to define the input/output layers, intermediate layers, and connections between elements. More specifically, the system displays a plurality of elements (N) and links (L), which form the system which the user will build, on the screen to allow the user to layout them to build a network that meets the requirements.

The neural network learns the correspondences between the input signals and the output signals as the load values and element parameters, accumulates the results, and outputs the output signals that correspond to the input signals. There are several algorithms used to learn these correspondences. One known algorithm is a back propagation (error back propagation).

In the back propagation, a plurality of pairs of input signals and their desired output signals (teacher information) are prepared, and the load values and element parameters are modified so that the output signals generated in response to the input signals become closer to the teacher information. Therefore, an error calculated in an element in a layer is sequentially propagated according to the load values assigned to the links to the elements in the previous layer. This means that the more closely an element is associated with the error, the more largely its parameters are modified.

In a traditional system, modification processing means for performing this parameter modification is built after the whole neural network is built based on the neural network structure or the function and its parameters of each element, and then the modification processing means is added to the learning system. FIG. 34 is a conceptual diagram showing the relationship between a traditional neural network and the modification processing means M, with modification processing to be performed on a portion of element N being indicated by an arrow.

As shown in FIG. 34, the modification processing means M is built according to the network structure after the neural network is configured on the screen. This modification processing means M is created by a program which executes the learning system with the specified parameters, obtains an error that is a difference between the output signals and the teacher information that indicates the desired output signals, and modifies the element parameters so that this error converges.

Recently, a neural network also finds applications in the fuzzy inference. In these applications, each stage of the fuzzy inference is made to correspond to each layer of a network. Therefore, the above-mentioned modification means, provided for a neural network, enables each membership function to adjust itself (learning). FIG. 35 is a conceptual diagram showing how the neural network can be applied to the fuzzy inference. In this figure, f, Σ, and Π are elements N, representing a function, an algebraic sum, and an algebraic product, respectively.

PROBLEMS TO BE SOLVED BY THE INVENTION

However, in the above-mentioned prior art, the modification processing means M is built after a neural network, such as those shown in FIGS. 34 and 35, is built according to the structure or some other factors of the network. This requires the user to create a large modification processing program separately.

In addition, the modification of each element N in the prior art requires the user to design the modification processing system M according to the function or the parameters of the element N. So, if the network structure must be changed due to the deletion of, or some changes in, an element N, the modification processing means M must be re-designed. This also requires the user to re-build the modification processing system M each time the network is modified, affecting the efficiency of the learning system.

Another problem is that, when a neural network is applied to the fuzzy inference, the network configuration becomes complicated, making the build process of the modification processing means M more difficult and affecting the efficiency of the system build process still more.

In a traditional system-build system described above, the user cannot design a system by simply selecting and connecting elements N and links L, nor can the user display the connection of the elements N and links L in an easy-to-view format. For these reasons, the user cannot build the system efficiently.

These problems are found not only in a learning system but also in traditional data processing systems where the internal structure must be modified according to the progress of data processing. Conventionally, a system is built on a unit basis or on a section basis; however, the system modification means for modifying the entire system must be built after the system is built.

This invention seeks to solve the problems associated with the prior art described above. It is an object of this invention is to provide a data processing system which has a modification means for each unit of a system to allow the user to build a modification means at the same time the system is built and to build and change the system easily.

SUMMARY OF THE INVENTION

To achieve the above object, a data processing system of this invention is a data processing system containing a plurality of units each having an operation means for generating an output signal based on an input signal and a plurality of parameters representing a relationship between the input signal and the output signal, each of the units having a modification means for modifying the parameters. The parameter modification means provided in each unit allows the user to build a data processing system simply by connecting the units. In addition, the user can modify the whole system as a collection of processing in each unit.

A data processing system of this invention is a data processing system containing a plurality of units each having an operation means for generating an output signal based on an input signal and a plurality of parameters representing a relationship between the input signal and the output signal, wherein the units form a network structure and propagate the output signal of each of the units sequentially and, into the direction opposite to the direction of the output signal flow, an error signal representing a difference between the final output signal of the network and a desired output, each of the units having a modification means for modifying the parameters based on the error signal. The parameter modification means provided in each unit allows the user to build a data processing system simply by connecting the units to form a network structure. In addition, the user can modify the whole system as a collection of processing in each unit. Therefore, the user can easily build a system which has a complicated network structure.

A system-build system of this invention is a system-build system for building a system containing a plurality of units via a user interface, the system comprising: unit selection means for selecting necessary units from the plurality of units; unit connection means for connecting a plurality of units selected by the unit selection means; and system configuration status display means for displaying a system configuration status by displaying, as signal paths, the connection status of the plurality of units connected by the unit connection means.

A system-build method of this invention is a method for building a system containing a plurality of units via a user interface, the method comprising: a unit selection process for selecting necessary units from the plurality of units; a unit connection process for connecting a plurality of units selected by the unit selection process; and a system configuration status display process for displaying a system configuration status by displaying, as signal paths, the connection status of the plurality of units connected by the unit connection process. Therefore, the user can build a system simply by necessary units and connecting them. In addition, the user can check the displayed connection status.

Other and further objects, features and advantages of the invention will appear more fully from the following description.

BRIEF DESCRIPTION OF THE DRAWINGS

FIG. 4(a) is a conceptual diagram showing forward operation of system S used in the embodiment. FIG. 4(b) is a conceptual diagram showing backward operation of system S used in the embodiment.

FIG. 20 is a diagram showing an example of a network definition coded in the network description language in the first embodiment.

FIG. 21 is a diagram showing an example of the connection information table when a network definition is coded in the network description language in the first embodiment.

FIG. 26 is a diagram showing an example of membership function label definition used in the embodiment.

FIG. 31 is a diagram showing an example of membership function labels defined after learning in the embodiment.

DETAILED DESCRIPTION

Referring to the attached drawings, there is shown a preferred embodiment of the present invention. This embodiment is implemented by a program which controls a computer. Because the program or the computer may be configured in a variety of ways, the following explains the embodiment assuming that each function of this invention is represented by a virtual circuit block or a collection of processing.

A. System Configuration, Operation, and Effects
(1) System Configuration The system used in this embodiment is configured as a network of a plurality of units each having a simple processing function. The term "forward processing", used in the following discussion, refers to the signal processing function which executes the signal procedure in the sequence in which the system is normally required to follow. In contrast, the term "backward processing" refers to the function which changes the internal status in order to make the I/O characteristics compatible with the desirable ones. The system built in this embodiment has both processing functions: forward and backward. This embodiment corresponds to the data processing systems claimed in claims 1–10.

Figure 1:
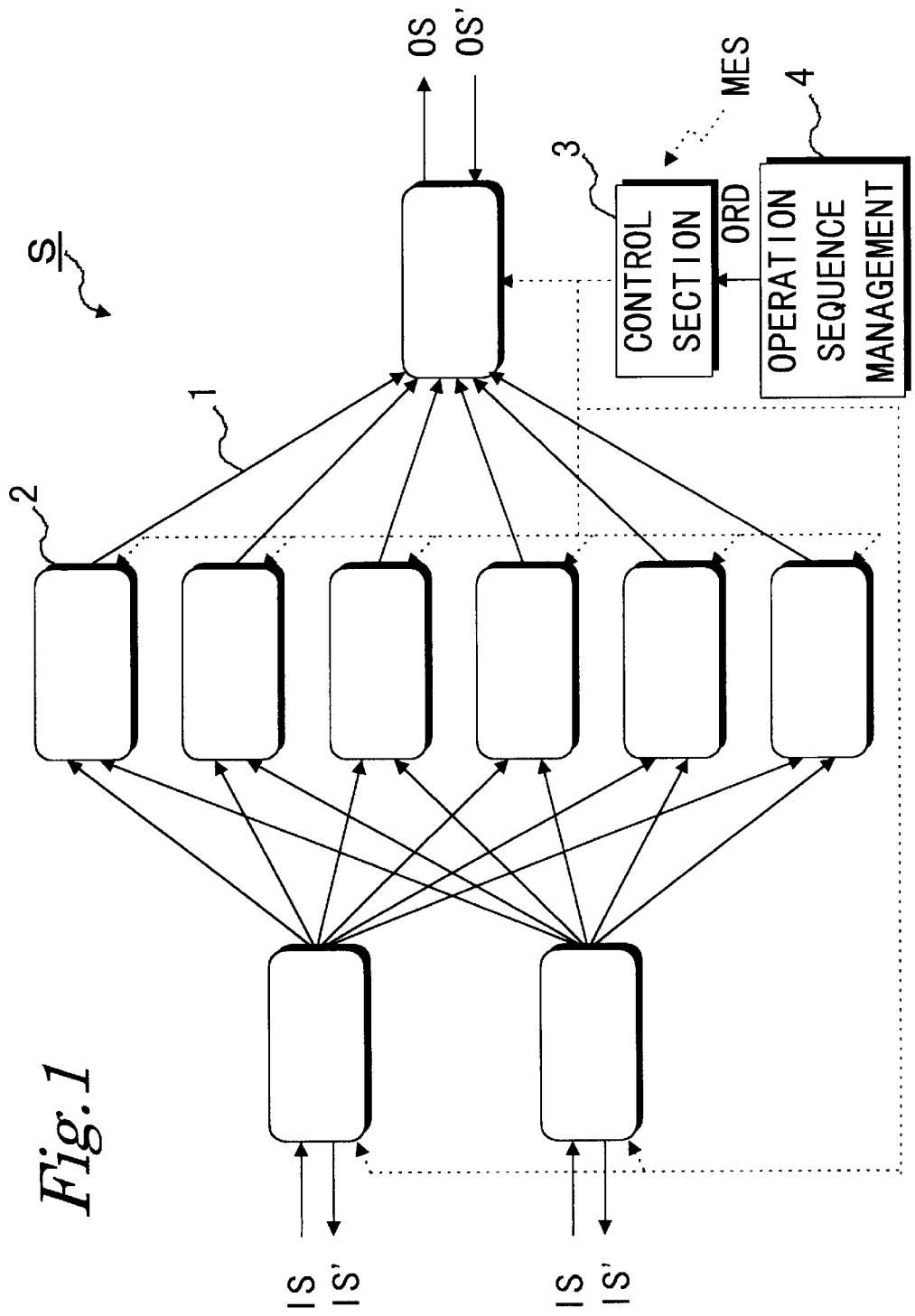
FIG. 1 is a functional block diagram showing conceptually an example of the configuration of system S used in an embodiment of this invention.

FIG. 1 is a functional block diagram showing conceptually an example of configuration of the learning system (hereafter called system S) used in this embodiment. As shown in this figure, the system S consists of a plurality of units 2 connected each other with the signal paths 1. Upon receiving an input signal IS at the input terminal, the system S performs forward processing; that is, it sequentially propagates the signal and outputs it as the output signal OS. Conversely, upon receiving an error signal OS' at the output terminal, the system performs backward processing; that is, the system propagates the signal in the backward direction and outputs it as the error signal IS' at the input terminal.

When the control section 3 receives an operation message MES from an external device, it sends the operation message MES to each of units 2 based on the operation sequence information ORD stored in the operation sequence management section 4. Here, an external device refers to the system control unit controlling the system S, the input means through which the user enters a command, or and so on. For example, this embodiment is implemented in an object-oriented programming environment in which each unit 2 is a separate instance and a message is sent from another instance acting as the control section 3 to each unit 2. This control section 3 corresponds to the unit control means described in claim 5.

Figure 2:
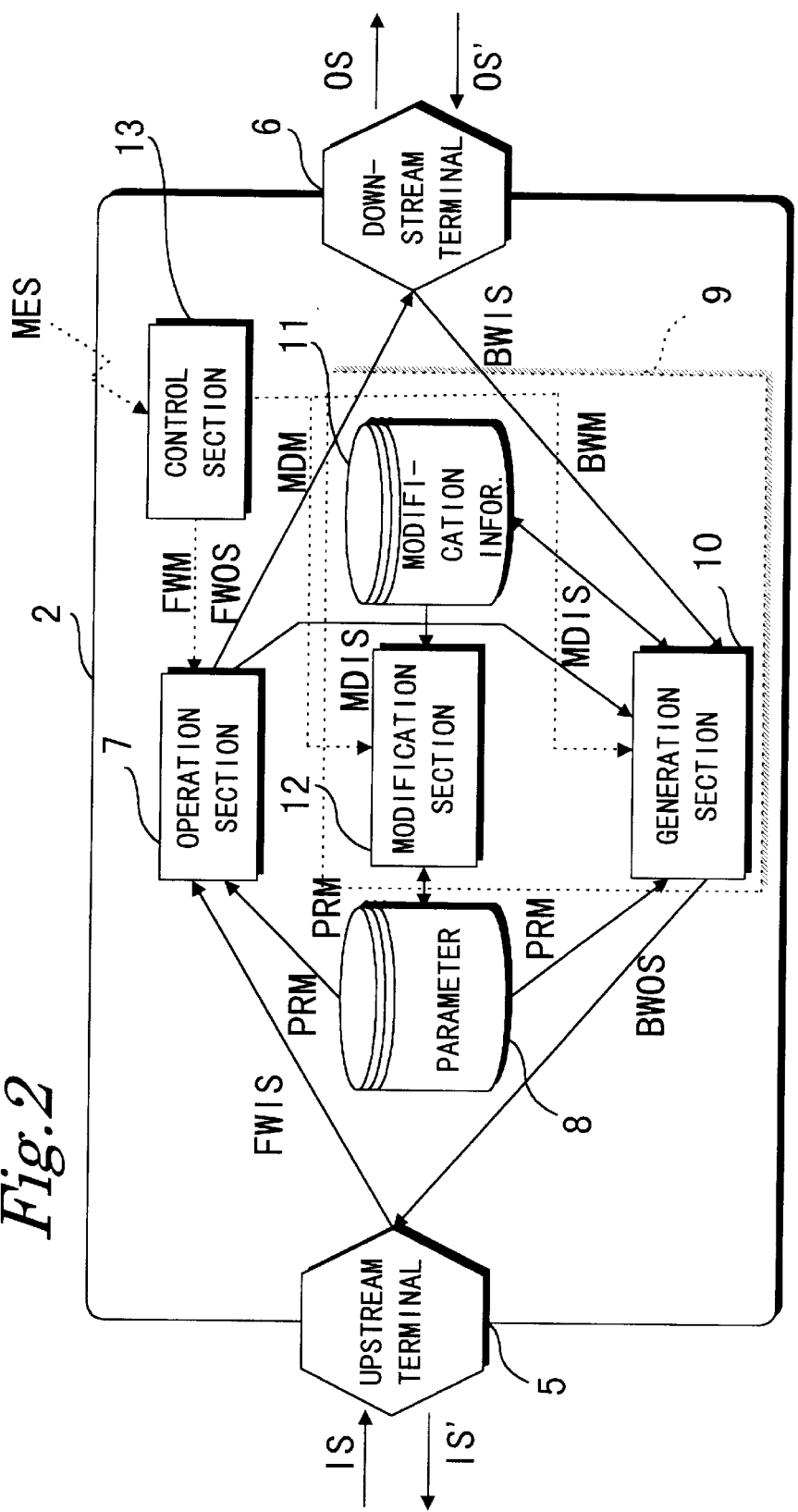
FIG. 2 is a functional block diagram showing the configuration of unit 2 used in the embodiment.

FIG. 2 is a functional block diagram showing the concrete configuration of each unit 2. As shown in this figure, each unit 2 has the upstream terminal 5 and the downstream terminal 6 for information transfer to or from the signal path 1 shown in FIG. 1. Although one upstream terminal 5 and one downstream terminal 6 are provided in FIG. 2, a plurality of them may be provided to each unit shown in FIG. 1. And, the upstream terminal 5 and downstream terminal 6 are designed to allow signals to be sent not only from downstream to upstream but also from upstream to downstream. The upstream terminal 5 corresponds to the first terminal in claim 10, while the downstream terminal 6 corresponds to the second terminal.

It should be noted that the signal path 1 shown in FIG. 1 is activated, not by the operation message MES, but by an event generated in one of the connected units 2 in which an operation is completed. Through the signal path 1, the forward output signal FWOS or backward output signal BWOS is sent from the downstream terminal 6 or the upstream terminal 5 of one of the units 2 to the upstream terminal 5 or the downstream terminal 6 of the other unit 2.

When the upstream terminal 5 or the downstream terminal 6 receives a signal, which is either the forward output signal FWOS or the backward output signal BWOS, from within the unit 2, the terminal retains the contents of the signal and, at the same time, sends the signal to the signal path 1. On the other hand, when the upstream terminal 5 or the downstream terminal 6 receives a signal from an external device, the terminal retains the contents of the signal and passes the signal to an internal component of the unit 2 when the component accesses the signal.

Each unit 2 also has the operation section 7 which executes the forward processing described above, and the parameter storage section 8 which contains forward operation parameters PRM (hereafter called parameter PRM) used for forward processing. The operation section 7 executes the forward processing operation based on two factors: the forward input signal FWIS entered from the upstream terminal 5 and the parameters PRM stored in the parameter storage section 8. Then, the operation section sends the operation result to the downstream terminal 6 as the forward output signal FWOS. The operation of the operation section 7 and the parameter PRM are set up according to the function of each unit 2. This feature makes it possible to vary the function according to the unit 2, shown in FIG. 1, or to allow the units of the same layer to have the same function.

Each unit 2 has the learning section 9 which updates the parameter PRM, stored in the parameter storage section 8 described above, and executes learning, that is, performs backward processing described above. This learning section 9 has the generation section 10 which generates modification information MDIS for the backward processing described above, the modification information storage section 11 which stores the modification information MDIS, and the modification section 12 which modifies the parameter PRM described above according to the modification information MDIS.

After generating modification information MDIS based on the backward input signal BWIS sent from the downstream terminal 6 (i.e., the error signal OS' indicating an error propagated between units 2) and the parameters PRM stored in the parameter storage section 8, the generation section 10 sends the operation result to the upstream terminal 5 as the backward output signal BWOS. It also sends the modification information MDIS to the modification information storage section 11. More specifically, upon receiving an error from the downstream (that is, the backward input signal BWIS), the generation section 10 outputs the backward output signal BWOS indicating an error to the upstream while taking into consideration how much its own parameter PRM is concerned with the error. This signal is input into the downstream terminal 6 of the unit 2 on the upstream side as the error signal OS'.

At this point, the generation section 10 may generate modification information MDIS based on the error signal OS', the parameters PRM stored in the parameter storage section 8, as well as information contained in the operation section 7 (for example, forward input signal FWIS or forward output signal FWOS).

The modification section 12 modifies parameters based on two factors: the modification information MDIS stored in the modification information storage section 11 and the parameters PRM stored in the parameter storage section 8. More specifically, based on error information (that is, the backward output signal BWOS) sent from the downstream, the modification section 12 performs operation to check how much parameter PRM modification will be needed to reduce the error, and stores the result into the parameter storage section 8 as the new parameter PRM.

Each unit 2 has the control section 13 which controls the operation of the internal components of the unit 2. Based on the operation message MES sent from the control section 3 located outside the unit 2 shown in FIG. 1, the control section 13 sends operation instructions to each component. That is, the control section 13 sends the forward operation instruction FWM to the operation section 7, the backward operation instruction BWM to the generation section 10, and the modification operation instruction MDM to the modification section 12.

Figure 3:
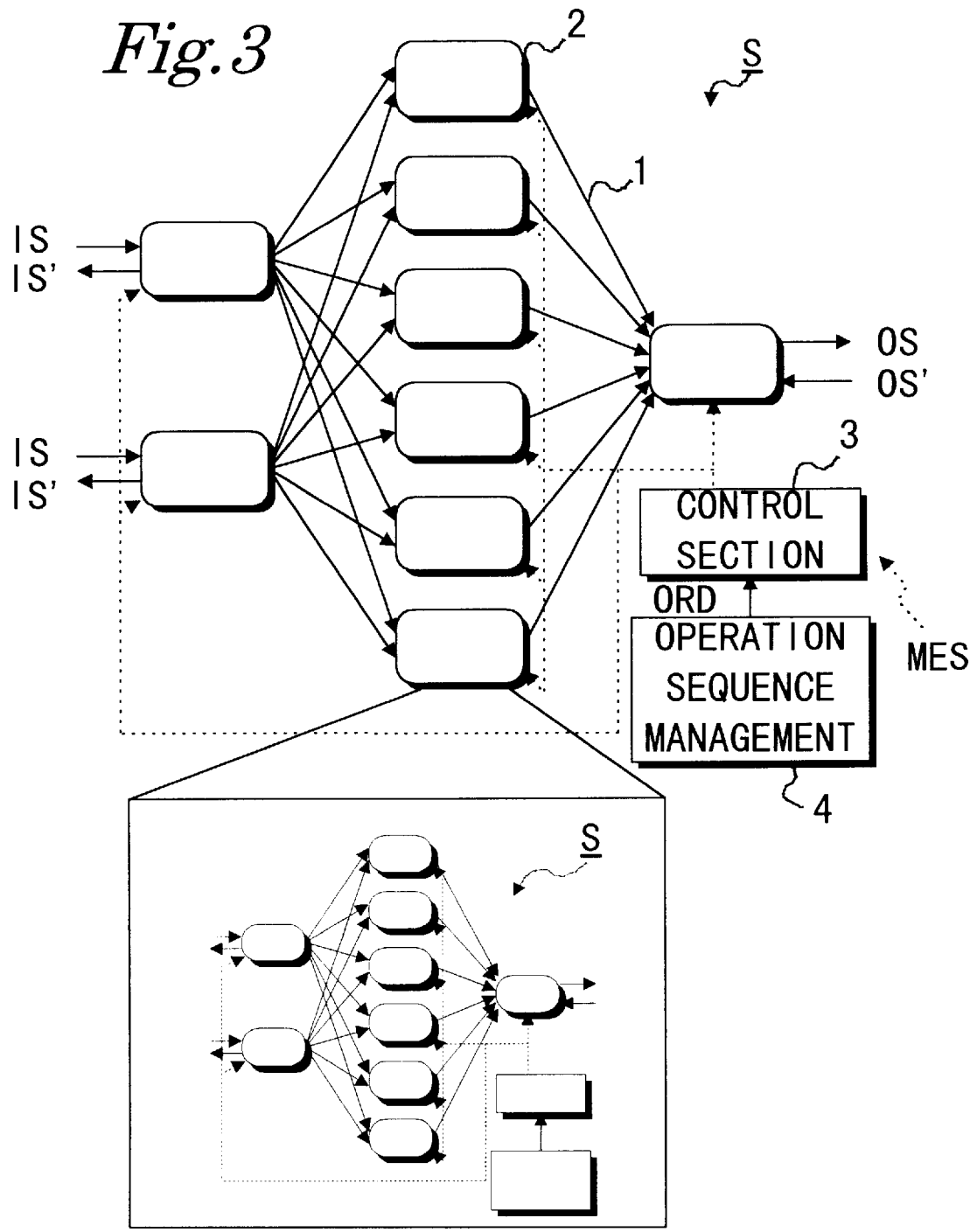
FIG. 3 is a functional block diagram showing conceptually an example of the configuration of a system when system S used in the embodiment has a hierarchical structure.

As shown FIG. 3, the whole system S may be structured hierarchically, with the system S in FIG. 1 as a lower-level unit and as a higher-level unit.

The operation section 7, generation section 10, modification section 12, and control section 13 correspond to the operation means, generation means, and modification means claimed in claims 1 and 3 and the control means claimed in claim 6, respectively.

(2) Operation and Effects of the System

The following explains how the system S in this embodiment operates.

(2-1) Operation of the system S

Conceptually, the system S in FIG. 1 operates as follows:

[Forward processing]

FIG. 4(a) is a conceptual diagram showing how the system S performs forward processing. As shown in the figure, when the input signal IS is sent to the input terminal of the learning system S and when the operation message MES instructing forward processing is sent from an external device to the control section 3, the control section 3 sends the operation message MES instructing forward processing to the units 2 in the order in which operations are performed. This causes the input signal IS to be sent to the unit 2 via the signal path 1. A signal from each unit 2 is also sent, via the signal path 1, to the unit 2 in the following stage and output the output terminal as the output signal OS.

In some cases, the system S contains hierarchically-structured units 2 and each unit, in turn, contains another system S. In this case, when each unit 2 receives the operation message MES indicating forward processing, it recursively repeats the same processing for that system S in the unit 2 as for the whole system S shown in FIG. 1.

For example, in FIG. 4(a), assume that the operation message MES is sent to the units in order of (1) to (9). This causes the units 2 to operate in this order; that is, the operation section 7 shown in FIG. 2 performs forward processing to send the input signal IS from the input terminal to the output terminal. As a result, the output signal OS is sent to the output terminal as the operation result of forward processing.

Although the units 2 are activated in order of (1) to (9) in the above description, this is not always necessary. That is, the units 2 may be activated concurrently. This is true of the backward processing described below.

[Backward processing]

FIG. 4(b) is a conceptual diagram of backward processing performed by the system S. As shown in the figure, when the output signal OS' is sent to the output terminal of the system S and, at the same time, the operation message MES indicating backward processing is sent from an external device to the control section 3, the control section 3 sends the operation message MES indicating backward processing to the units 2 in the specified operation order.

For example, assume that the operation message MES is sent to the units (1) to (9) in this order, as shown in FIG. 4(b). This causes, in each unit 2, the generation section 10 to perform generation processing operation, and the modification section 12 to perform modification processing operation. That is, the generation section 10 generates the backward output signal BWOS, which an error in the unit 2, based on the backward input signal BWIS and the parameter PRM. If there is the next layer, this backward output signal BWOS is sent as the error signal OS' of the unit 2 of the next layer sequentially.

Thus, the error signal OS' flows from the output terminal to the input terminal. As a result, the modification information MDIS is accumulated in the modification information storage section 11 of each unit 2 and, at the same time, the parameters PRM stored in the parameter storage section 8 are modified. And, the error signal IS' to be sent to the system in the previous stage is generated at the input terminal.

(2-2) Learning in the system S

The system S, which has the forward processing function and the backward processing function, performs the learning operation as follows. In performing the learning operation, the system S usually uses a plurality of data set pairs, each pair consisting of the input signal IS and a data set for the output signal OS which should correspond to the input signal IS (teacher information)

Figure 5:
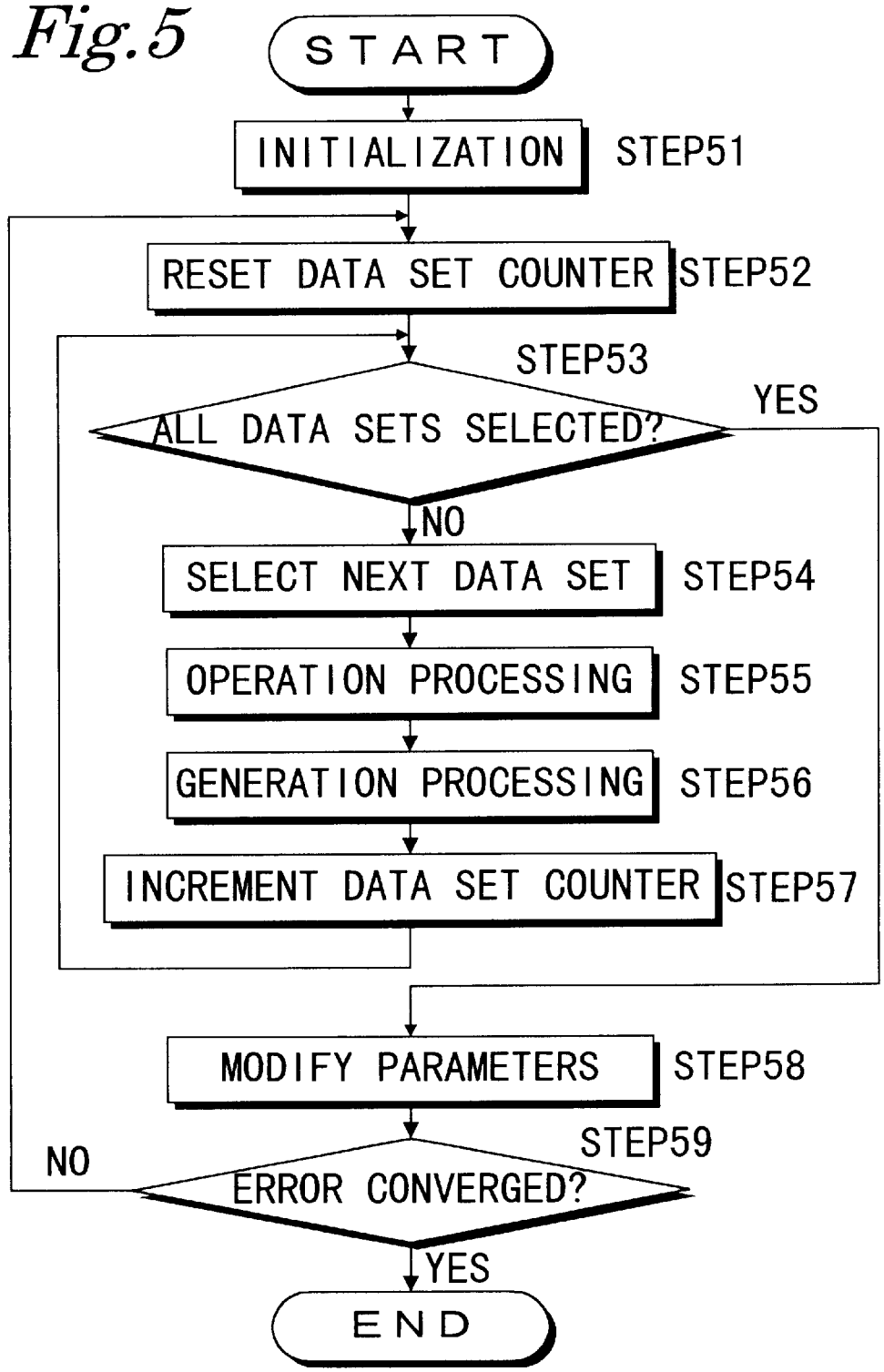
FIG. 5 is a flowchart showing the learning procedure used in the embodiment.

FIG. 5 is a flowchart showing the procedure for learning. First, the control means of the system having the system S, not shown in the figure, performs initialization (step 51) and then resets the data set counter (step 52). Next, the control means (or the user) checks if it has selected all the data sets (step 53) and, if not, sequentially selects the next data sets (step 54).

Then, the control means (or the user) sends the operation message MES to the control section 3 to cause it to do the above-mentioned forward processing, based on the input signal IS from the selected data set (step 55). During this generation processing, the output signal OS is generated. That is, upon receiving the operation message MES, the operation section 7 in each unit 2 shown in FIG. 2 generates the forward output signal FWOS corresponding to the forward input signal FWIS, based on the parameter PRM. This forward output signal FWOS is then sent to the unit 2 of the next layer as the input signal IS when there is the next layer.

Next, based on the generated output signal OS and the teacher information, the control means performs the above-mentioned generation processing through back propagation (step 56). That is, the generation section 10 generates the error signal OS', based on the output signal OS and the teacher information, and sends it to the output terminal. This allows the modification information MDIS to be generated and stored in unit 2.

In each unit 2, error information on each unit 2 of the layer is generated, based on the output signal OS and the parameters PRM including the error information and load values. This error information is then sent to each unit 2 of the previous layer. In each unit 2, the modification information on the parameters PRM is generated and is added to the modification information MDIS.

Then, the control means increments the data set counter (step 57), and the control means (or the user) checks to see if all the data sets have been selected (step 53). It repeats steps 53–57 until all the data sets have been selected. After all the data sets have been selected, the control section 3 performs modification processing on the parameters PRM in each unit 2 (step 58). That is, in FIG. 2, the control section 13 in each unit 2 sends the modification operation instruction MDM to the modification section 12 upon receiving the operation message MES indicating modification processing from the control section 3. This causes the modification section 12 to modify the parameters PRM based on the modification information MDIS stored in the modification information storage section 11.

After this modification processing, the control section 13 initializes the modification information MDIS stored in the modification information storage section 11. The control section 3 checks to see if the error of the whole system S satisfies a condition, for example, if the error of the whole system S falls within a specified range (step 59). If the specified condition is satisfied, the processing is repeated beginning in step 52. Note that the modification processing (step 58) may be performed after the generation processing (step 56) for each data set.

(2-3) Building the system S

Figure 6:
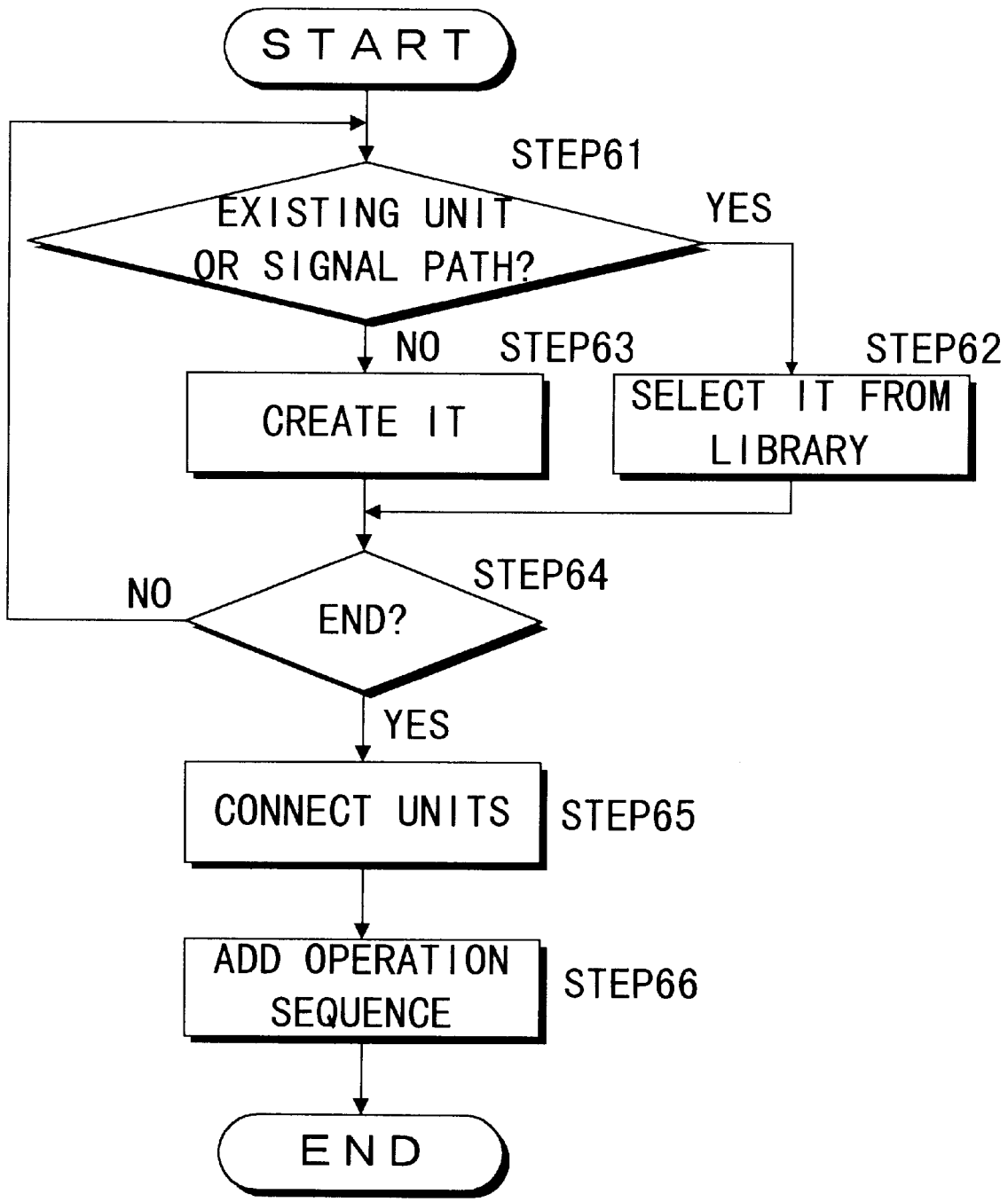
FIG. 6 is a flowchart showing the procedure for building a system S in the embodiment.

The following summarizes the procedure for building a system S described above. FIG. 6 summarizes the procedure for building a system S in this embodiment. As shown in this procedure, the user sequentially selects the elements, one at a time, required for the system S, that is, those elements such as the units 2 and the signal paths 1 (step 62). After selection (step 64), the user connects the elements (step 65) and adds the operation sequence to the control means (control means owned by the system for building the system S) (step 66).

The existing units 2 and signal paths 1 are selected from the previously-created library for building the system (steps 61 and 62). On the other hand, the user creates the new units 2 and signal paths 1 (step 63). To create the units 2 and signal paths 1, the user uses function type or procedure type to code the operation of the operation section 7 (forward processing), the operation of the generation section 10 (backward processing), and the operation of the modification section 12 (modification processing). The operation sequence depends on the information flow from the input signal to the output signal, considering the signal dependency.

As described above, the system S in this embodiment consists of the units 2, each having the forward processing function and the backward processing function. Therefore, the system S in this embodiment has the following advantages. The system S, consisting of the units 2 connected each other by signal paths 1, performs forward processing and backward processing while synchronizing the units 2 with messages from the control section 3. Thus, the control section 3 allows the user to control the units 2 to perform the necessary operations such as output signal OS generation or learning. For example, during execution of the learning operation through backward propagation, the learning section 9 of each unit 2 is automatically controlled in the reverse order of forward processing.

Another advantage is that the user can build the system S simply by connecting the units 2, because each unit 2 has the learning section 9. Also, the user can perform the learning or modification operation on the whole system S simply by combining the corresponding learning or modification operations in all the units 2. At this time, although information such as error information is transferred between units 2, the learning operation in each unit 2 is completed in the unit 2. This eliminates the need for the user to design the learning or modification means specifically for the whole system S after the user has built or changed the system S, thus making the system-build task easier. Thus, when building the system S in this embodiment, each unit 2 may be built independently. And, the system for building the system S is required to have only the editing function of each unit 2 and connecting function of all the units 2, making the configuration simpler.

Because, in this embodiment, the parameters PRM may be modified based on the modification information MDIS, the learning processing may be executed in such a simple method as back propagation.

B. Configuration, Operation, and Effects of the System-Build System

The following explains the system-build system in this embodiment used to build the system S described above. This embodiment corresponds to the system-build system claimed in claims 11–18.

Figure 7:
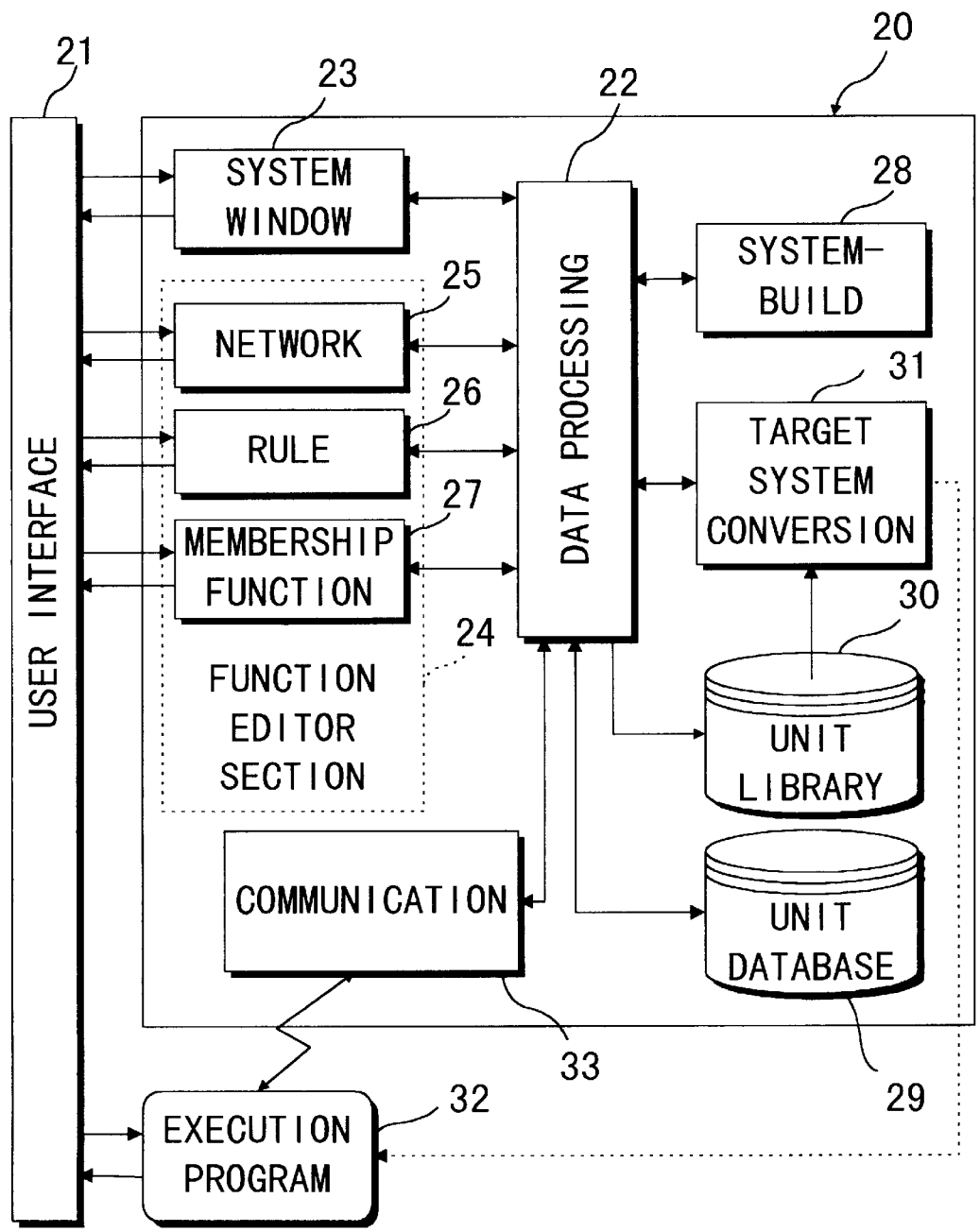
FIG. 7 is a functional block diagram showing the configuration of system-build system 20 in an embodiment of this invention.

FIG. 7 is a functional block diagram showing the configuration of the system-build system 20 in this embodiment. In this figure, 21 is the user interface section which has a display such as a CRT display and an input device such as a keyboard or mouse. The system-build system 20 transfers information to or from the user via the user interface section 21. Other input/output devices may be used; for example, the display may be a liquid crystal display and, as the input device, a light pen may be used instead of a mouse.

In FIG. 7, the data processing section 22 analyzes commands, entered via the user interface section 21, and processes entered design information. The processing results are sent to each component in the system-build system 20. The system window 23 transfers operation information, used for building the system S, to or from the user via the user interface section 21. That is, when the user enters a command from the user interface section 21, the system window 23 sends the command to the data processing section 22. Conversely, upon receiving data from the data processing section 22, the system window 23 sends the contents of the data to the user interface section 21; for example it displays data on the display. The system window 23 appears to the user as the system unit of the system-build system 20.

The function editor section 24 has function editors such as the network editor 25, rule editor 26, and membership function editor 27. The function editor section 24 transfers system S design information to or from the user via the user interface section 21. The function editors of the function editor section 24 each have the interfaces compatible with the functions of the units 2 of the system S. Therefore, the function editors may be assigned according to the function of the unit 2.

When the user enters system S design information via the user interface section 21, the function editor section 24 sends it to the data processing section 22. When design information is sent from the data processing section 22, the function editor section 24 informs the user of the information; for example, the section displays the information on a display connected to the user interface section 21.

In FIG. 7, the system design data storage section 28 contains system S design information to be processed by the data processing section 22. This design information is managed on a unit 2 basis. The details of this design information will be described later.

The unit database 29 contains two types of information: one is the design information to be used by the user to edit or check the system S design information that is required for each unit 2 and the other is the definition of a function editor to be used to edit or check the design information on the unit 2. Thus, when the data processing section 22 receives an editor start request for a unit 2 from the user, it references the unit database 29 for a function editor that is used for the unit 2.

The unit library 30 is a library which contains the template for each unit required for building the system S. To use each template, the user must specify actual design information values for the unit 2. The template for each unit 2 consists of the definition of processing to be performed by the operation section 7, generation section 10, and modification section 12.

The target system conversion section 31 links the template in the unit library 30 based on the design information stored in the system design data storage section 28 to generate an execution program 32. This program implements the target system S. The execution program 32, the entity of the system S designed by the system-build system 20, is executed as a program separate from the system-build system 20.

The communication section 33 allows the system-build system 20 to communicate with the execution program 32. That is, the communication section 33 sends information on the processing to be performed by the execution program 32 to the data processing section 22 and, at the same time, sends the instructions from the data processing section 22 to the system S.

[Function editor 24]

The following details the function editor section 24. In this embodiment, there are three editors: the network editor 25, rule editor 26, and membership function editor 27, as described above.

①Network editor 25

First, the network editor 25 is explained. The network editor 25, which is for connecting a unit 2 to another unit 2 with a signal path 1, allows the user to design the configuration of the system S that satisfies the need. That is, this editor is used to edit the configuration of a network such as the one shown in FIG. 1. In addition, a unit 2 may have another unit 2 within itself (hierarchical structure). The network editor 25 is used as the function editor for such a unit 2. Thus, even when the structure of the system S is complicated, the user can specify a hierarchical structure with the network editor 25 to build a functional system in the consistent manner.

Figure 8:
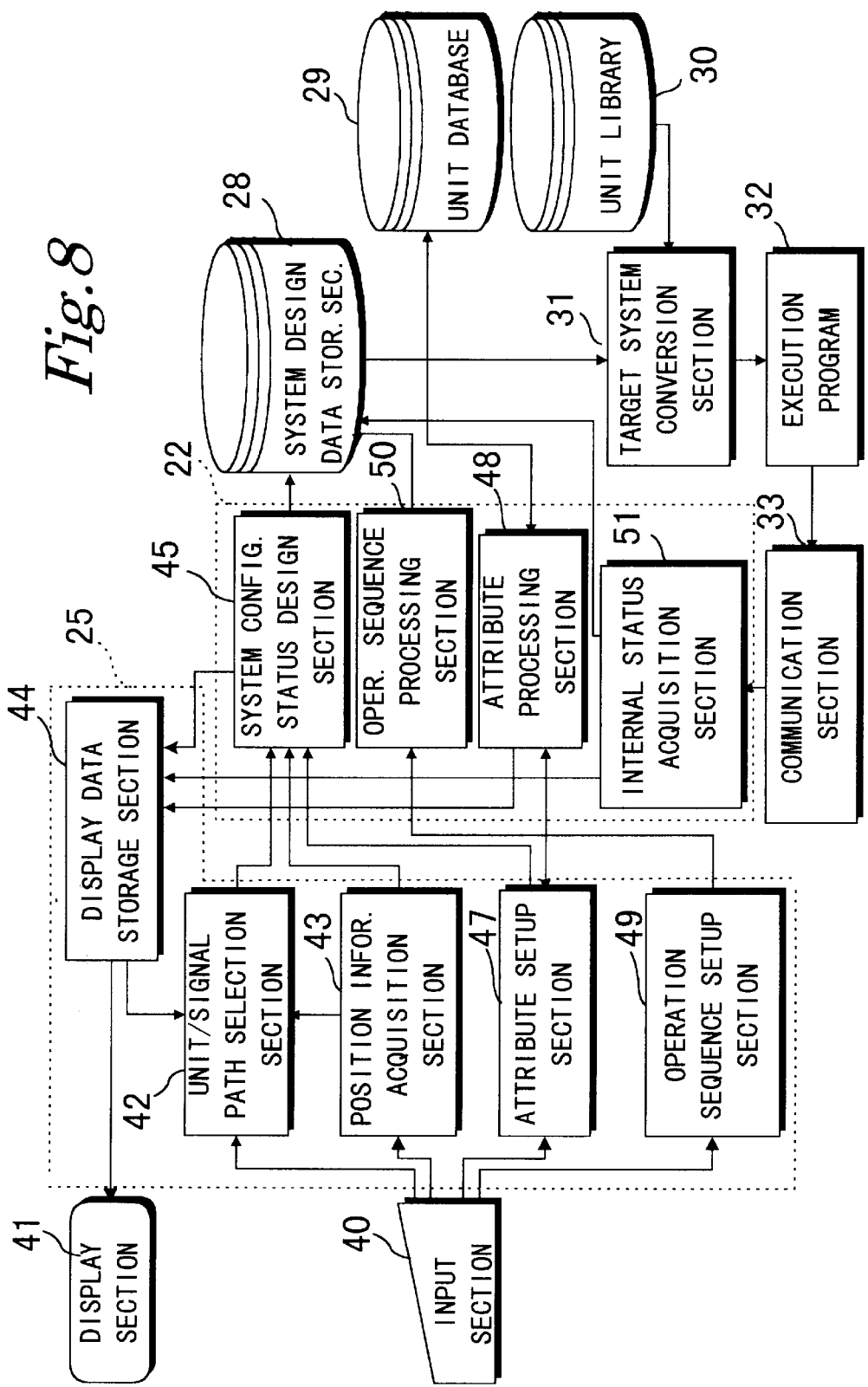
FIG. 8 is a functional block diagram showing the details of the network editor 25 and the data processing section 22 used in the embodiment as well as their relationship with other components.

FIG. 8 is a functional block diagram showing the details of the network editor 25 and the data processing section 22 and their relationship with other components. As shown in this figure, the network editor 25 has the unit/signal path selection section 42 and the position information acquisition section 43. When the user selects a unit 2 or a signal path 1 from the input section 40 of the user interface section 21 (which is the input device described above), the unit/signal path selection section 42 gets the user-selected information. When the user specifies the arrangement position of the unit 2 or the signal path 1 from the input section 40, the position information acquisition section 43 gets that information.

The network editor 25 also has the display data storage section 44 which contains data to be displayed on the display section 41 of the user interface section 21 (which is the display described above). When data is sent from the unit/signal path selection section 42 or the position information acquisition section 43 to the display data storage section 44, the unit 2 and signal path 1 are displayed at the specified positions. In addition, when the user selects an existing unit 2 or signal path 1, the unit 2 or signal path 1 stored in the display data storage section 44 are displayed on the display section 41 and, at the same time, sent to the unit/signal path selection section 42. This causes units 2 and signal paths 1, selected by the user via the input section 40, to be obtained by the unit/signal path selection section 42.

The data processing section 22 has the system configuration status design section 45 to which information obtained by the unit/signal path selection section 42 and the position information acquisition section 43 are sent. And, based on the information on the types of units 2 and signal paths 1 sent from the unit/signal path selection section 42 and on the arrangement information on the units 2 and signal paths 1 sent from the position information acquisition section 43, the system configuration status design section 45 sequentially designs the system configuration. That is, when the user selects units 2 from the input section 40 and connects the units 2 with signal paths 1, the system configuration status design section 45 generates the design information on the system S from the relationship between the units 2, formats the generated information, and stores it into the system design data storage section 28. Also, the system configuration status design section 45 sends the design information to the display data storage section 44 of the network editor 25 to display it on the display section 41 connected to the user interface section 21.

The network editor 25 has the attribute setup section 47 which gets the user-specified attributes of the arranged units 2 specified by the user via the input section 40. Here, an attribute refers to the name of the function of, and other information on, a unit 2. When specifying the attribute of a unit 2, the attribute setup section 47 allows the user to select and get necessary attributes from the unit database 29 via the input section 40. The data processing section 22 has the attribute processing section 48 which gets the attributes, defined via the input section 40, and stores them into the unit database 29 and unit library 30. The system configuration status design section 45 stores the contents of the attributes of units 2 into the system design data storage section 28.

Attributes may be specified for example, via a menu displayed on the display section 41 interactively. That is, the menu display processing section (not shown in the figure) displays the attributes in the dialog menu of the display section 41 to allow the user to use existing attributes. When the user uses the input section 40 to select an attribute from those displayed in the dialog menu, the attribute setup section 47 and system configuration status design section 45 get its contents.

This menu display processing section is implemented as a part of the attribute setup section 47 or as a part of the system window 23.

The network editor 25 has the operation sequence setup section 49 which gets an operation sequence specified by the user via the input section 40 for the arranged units. The data processing section 22 has the operation sequence processing section 50 which stores an operation sequence, obtained by the operation sequence setup section 49, into the system design data storage section 28, In FIG. 8, the data processing section 22 has the internal status acquisition section 51. The internal status acquisition section 51 gets the internal status of the execution program 32 via the communication section 33 and sends it to the display data storage section 44. This enables the user, with network editor 25 started, to display what the execution program 32 is doing.

The unit selection means claimed in claim 11 corresponds to the unit/signal path selection section 42, and the unit connection means claimed in that claim corresponds to the unit/signal path selection section 42 and position information acquisition section 43. The system configuration status display means, display means, unit display means, and signal path display means claimed in claims 11, 15, and 17 correspond to the system configuration status design section 45 and the display data storage section 44. The editing means claimed in claim 18 and the configuration status editing means claimed in claim 17 correspond to the unit/signal path selection section 42 and the position information acquisition section 43. The connection information storage means claimed in claim 17 corresponds to the system design data storage section 28, and the design information update means corresponds to the system configuration status design section 45. The function assignment means claimed in claim 13 corresponds to the attribute setup section 47. The execution program generation means claimed in 18 corresponds to the target system conversion section 31, and the execution contents acquisition section corresponds to the communication section 33 and internal status acquisition section 51.

② Rule editor 26

The following explains the rule editor 26. This rule editor 26 corresponds to the rule setup means, one of the function information setup means described above. The rule editor 26 is used to design and modify IF-THEN rules when a unit 2 has a function, such as a fuzzy inference, which executes inference based on the IF-THEN rules. One unit 2 may have a plurality of IF-THEN rules. Design information on an IF-THEN rule is represented as a proposition, a list of labels of the proposition, and their combinations. This rule editor 26 is important in designing a fuzzy system. By implementing the inference function as a function of a unit 2, a fuzzy system may be built as a pattern of the system S.

Figure 9:
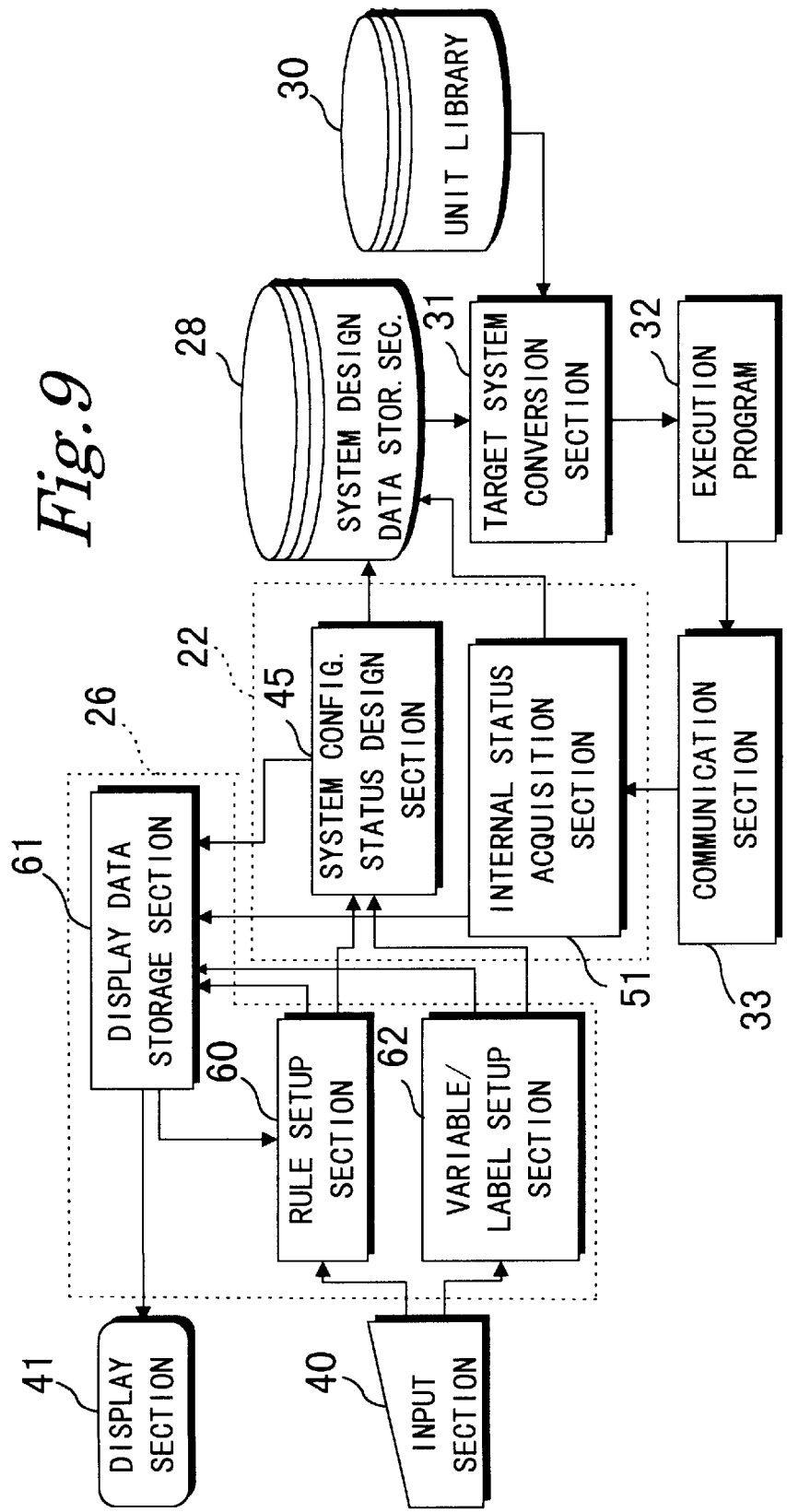
FIG. 9 is a functional block diagram showing the details of the rule editor 26 used in the embodiment and its relationship with other components.

FIG. 9 is a functional block diagram showing the details of the rule editor 26 and the relationship with other components. In the figure, when the user enters an IF-THEN rule from the input section 40, the rule setup section 60 reads the contents and sends them to the system configuration status design section 45 of the data processing section 22. The rule setup section 60 also sends the contents of the IF-THEN rule to the display data storage section 61. This causes the contents of data entered by the user from the input section 40 to be displayed on the display section 41.

In addition, the rule editor 26 has the variable/label setup section 62 which gets the labels assigned to the input/output variables by the user via the input section 40 before an IF-THEN rule is set up. The variable/label setup section 62 sends the variables and labels to the system configuration status design section 45 and to the display data storage section 61. This causes, for example, a label assigned to a variable to be added to the drop-down menu.

③ Membership function editor 27

Next, the membership function editor 27 is explained. The membership function editor 27 corresponds to the membership function setup means, one of the function information setup means claimed in claims 13. When a unit 2 has a function for specifying or evaluating a fuzzy-logic-based membership function, the membership function editor 27 is used to design and change the membership function. In this case, one unit 2 may have a plurality of membership functions. Design information for a membership function is represented as a set of parameters (hereafter called definition parameters) specifying the type of a membership function. The membership function editor 27 is an essential function for designing a fuzzy system having the learning function. A membership function, if implemented as a function of a unit 2, allows the user to build a fuzzy system as a type of system S.

To define a membership function, the "label" specifying the name of the membership function, the "type" of the membership function, and the parameters specifying the type must be specified as specific items.

Figure 10:
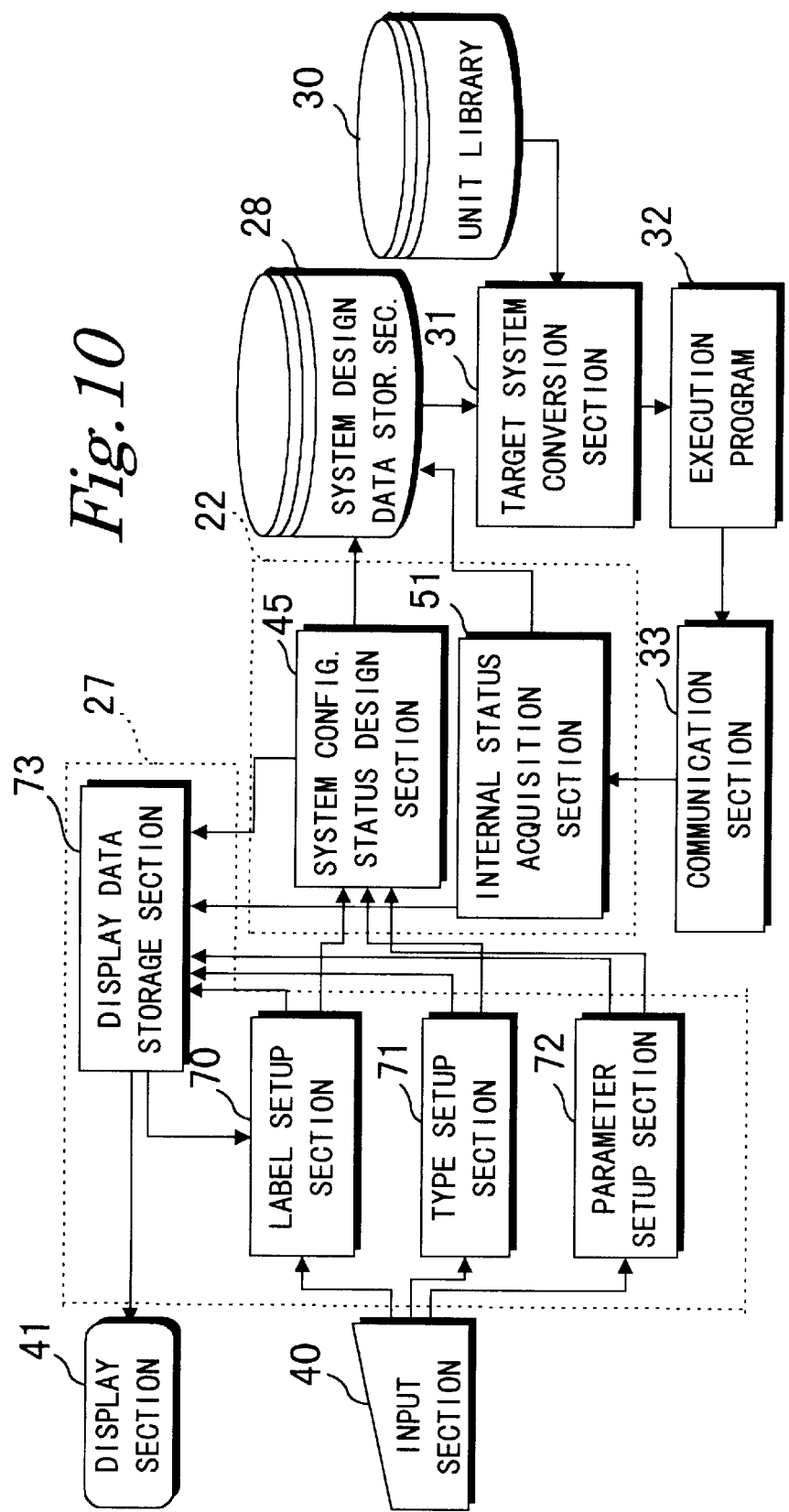
FIG. 10 is a functional block diagram showing the details of the membership function editor 27 used in the embodiment and its relationship with other components.

FIG. 10 is a functional block diagram showing the details of the membership function editor 27 and the relationship with other components. In the figure, there are the label setup section 70, type setup section 71, and parameter setup section 72. Upon receiving user-specified "labels", "types", or definition parameters from the input section 40, these sections get the contents and send them to the system configuration status design section 45 of the data processing section 22. And, each of these sections sends the acquired contents to the display data storage section 73 to display the contents entered from the input section 40 on the display section 41.

Note that, in addition to the network editor 25, rule editor 26, and membership function editor 27, the function editor section 24 may have any type of editor according to the function of the user interface section 21. For example, by grouping input/output data sets with the use of the specified clustering method, a function editor for automatically generating IF-THEN rule sets may be provided as an upgraded version of the rule editor 26.

[Design information on unit 2]

The following explains design information on units 2. Design information on units 2 stored in the system design data storage section 28 is divided roughly into two: common items and specific items. Common items are those common to all units 2, while specific items are those specific to a unit 2.

Common items include the dimensions of input/output data, function names which are the names of the functions of units 2, and learning value lists LPL. The dimensions of input/output data is specified when the user arranges units 2 and signal paths 1, while function names are specified as attributes.

A system S that is going to be built has the parameters PRM, as described before. These parameters PRM are specified for a plurality of systems S and, within a system S, they are distributed among the units 2 constituting the system S. The above-mentioned learning value list LPL refers to a set of the parameters PRM existing in a unit 2.

The learning value list LPL need not be specified for all units 2; it need be specified only for a unit 2 having parameters PRM that needs learning (learning parameters). The learning value list LPL, which is specified by a function editor belonging to the function editor section 24, may be specified basically via the common user interface section 21. For example, the user may specify the types of the parameters PRM when the user specifies the attributes of units 2 by the network editor.

Next, the following explains specific items. For example, when a unit 2 has a membership function, the definition parameters must be specified for it as specific items. And, the learning parameters, which are usually defined for the above-mentioned learning value list LPL, may be specified for these definition parameters. In this case, the learning value list LPL is specified by the membership function editor 27. That is, by specifying the learning parameters for the definition parameters of a membership function, a fuzzy system which can learn the type of a membership function may be implemented as the system S.

For a unit 2 having the neuron element function, specific values such as a synopsis coupling load value may be specified. And, by specifying the learning parameters, usually specified for the learning value list LPL, for this synopsis coupling load value, a network consisting of units 2, each having the neuron element function, may be built as a neural network.

For a learning parameter defined for the learning value list LPL, the change range and the initial value are specified. The change range is represented, for example, by the minimum value and the maximum value. Another learning value in the same learning value list LPL may be assigned to this range. This puts a limit on the relation of parameters. For the maximum value or the minimum value, the value of some other parameter in the same learning value list LPL need not be specified; instead, an arithmetic or logic expression including the value may be specified.

[User interface section 21 and related functional components]

The following explains the user interface section 21, shown in FIG. 7, and the functional components associated with the user interface section 21.

The execution program 32, shown in FIG. 7, is able to inform the system-build system 20 of the internal status of the execution program 32 during execution. This is done via the communication section 33 in the system-build system 20. This causes the user interface section 21 in the system-build system 20 to write the internal status of the execution program 32 into the system design data storage section 28 or to inform the user of the internal status via the function editor section 24.

For example, assume that a learning parameter PRM in a unit 2 is modified; that is, the learning value list LPL in the unit 2 is changed. Then, the execution program informs the user interface section 21 of the condition via the communication section 33, and the user interface section 21 informs the function editor section 24 that the learning value list LPL has been changed. This causes the function editor section 24 to perform the following. That is, on the display of the user interface section 21, the function editor section causes the function editor associated with the unit 2 to display information indicating that the learning value list LPL has been changed. This function allows the user to display and check the execution status without having to provide a large user interface in the execution program 32. In addition, the learning process and result of the system S may be reflected on the design information.

The function editor does not display all the parameters PRM that have been changed; it is designed to display only the parameters PRM of a unit 2 that are requested by the user.

For example, with an instruction device such as a mouse of the user interface section 21, the user specifies a unit 2 having a learning value list LPL. Upon receiving a request from the instruction device, the function editor section 24 displays the value of the parameters PRM of the specified unit 2, for example, in a popup menu format. When the user finishes the operation on the unit 2, the function editor section 24 stops the display. This reduces the amount of information to be displayed on the user interface section 21 by the function editor section 24, making it possible for the user to understand the whole operation status of the execution program 32.

In addition, when the function editor section 24 displays a unit 2, it tells the user interface section 21 to change the display format according to whether or not the unit 2 has a learning value list LPL. The display may be changed in a variety of ways: color change, texture change, highlighting, or animation. And, when the learning parameters changes as the execution program 32 performs operation on a unit 2 having a learning value list LPL, the function editor section 24 changes the display format according to the change amount. This function enables the user to visually check in which part of the system S learning is being performed and which part is being changed by learning.

(2) Operation and Effects of the System-build System 20

Figure 11:
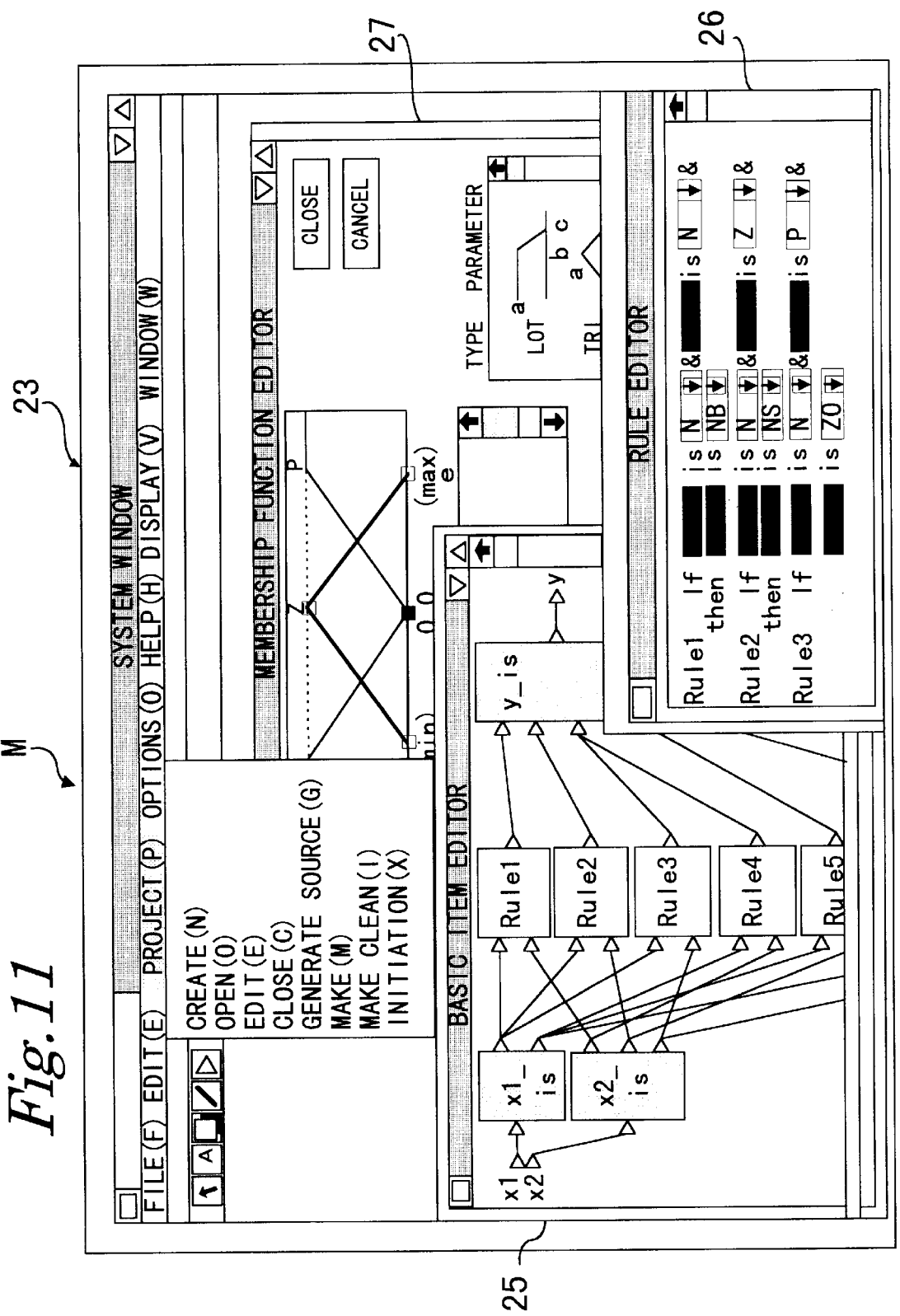
FIG. 11 is a diagram showing an example of the screen display of the system window 23 used in the embodiment.

The procedure for building the system S with the system-build system 20 in this embodiment is as follows. In the following explanation, the system-build system 20 is built as a software product with the GUI on a window system. FIG. 11 is an example of a display screen. As shown in the figure, the display screen contains the system window 23 where the function editors are run.

The user enters design information from the keyboard or the mouse via the user interface section 21 while visually checking entered information displayed on the menu window shown in FIG. 11. This means that the user can design the system S while selecting commands from the menu M. The user can also select items from the menu M displayed in FIG. 11 in order to convert the designed system S to the execution program 32.

Figure 12:
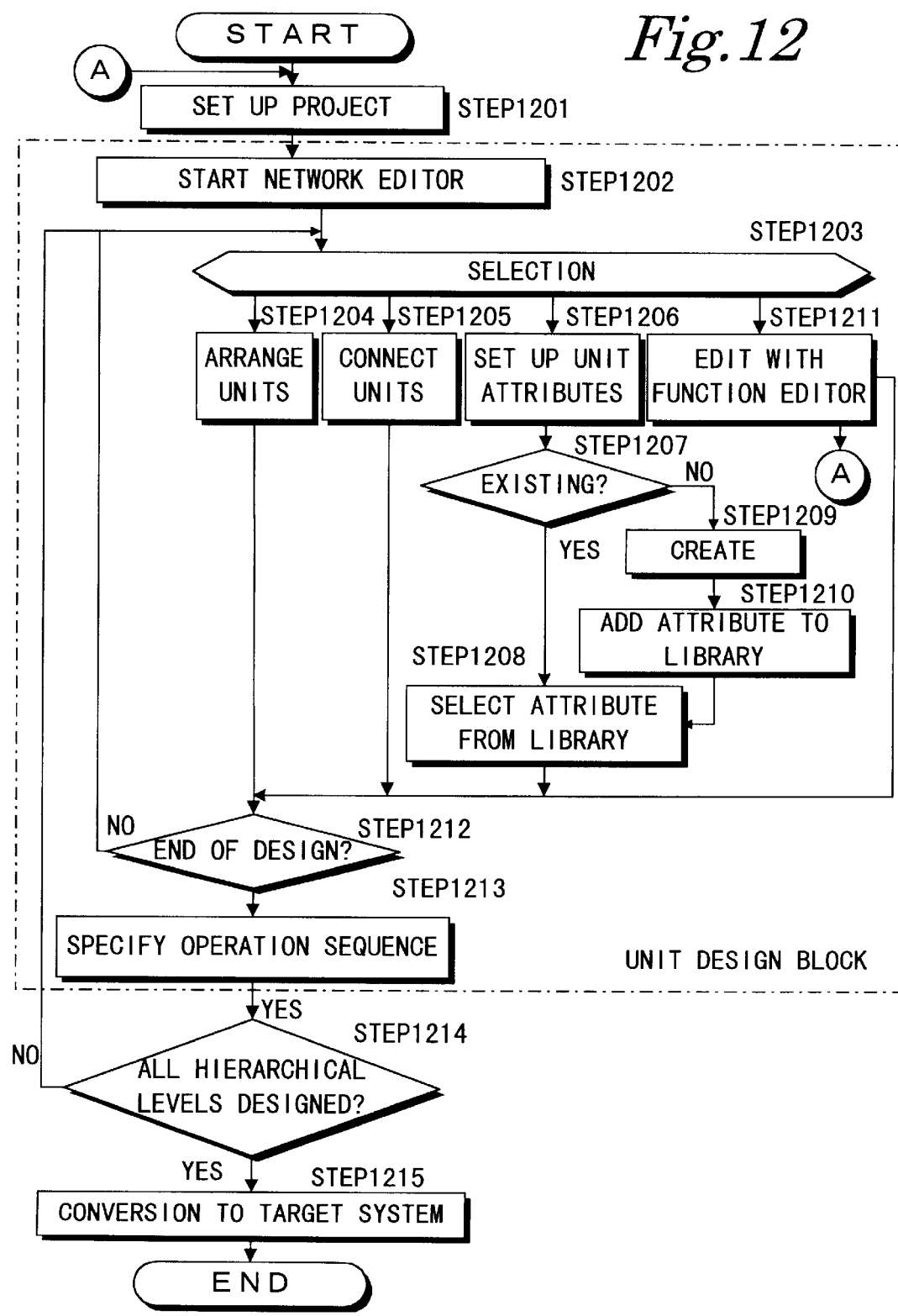
FIG. 12 is a flowchart showing how the system-build system 20 builds system S in the embodiment.

FIG. 12 is a flowchart showing the procedure for building the system S. First, the user enters the system-build start command from the input section 40 connected to the user interface section 21 to start the system window 23 (step 1201). Then, the screen of the system window 23 is displayed on the screen. The user sets up on the screen a project for setting up the target system. The project is a collection of basic information for the whole system S, including the name of the system S which is the target system.

Control is then transferred to the unit setup block. First, the user starts the network editor 25 (step 1202). In this step, the user uses the input section 40, such as the mouse or keyboard, to start the network editor 25 from the menu M (pull-down menu, etc.) displayed on the screen of the system window 23 shown in FIG. 11.

This network editor 25 may be started, not by the start request entered by the user, but automatically when the user has finished setting up the project.

The network editor 25 is used to edit the whole system S or, when a units 2 is hierarchically structured, the system configuration of the internal of the unit 2. The result is the screen, such as the one shown in FIG. 13, on which the units 2 and signal paths 1 are displayed. On the screen in FIG. 13, the arrangement of the units 2 and their connections are completed.

Next, the user selects one of the following operations from the screen displayed by the network editor 25 (step 1203). The operations include unit 2 arrangement (step 1204), connection of a plurality of arranged units 2 with signal paths 1 (step 1205), setup of the attributes of a plurality of arranged units 2 (step 1206–step 1210), and editing of design information on units 2 using the function editor (step 1211).

First, the user selects units 2 from the input section 40 and arranges them as follows (step 1204). More specifically, the user usually does the operation as follows: the user selects an item from the tool bar located in the upper-left corner of the system window 23 shown in FIG. 11, selects a desired unit 2, and arranges the unit 2 at a desired position on the screen of the network editor 25 (that is, the workspace of the network editor 25) shown in FIG. 12. The unit 2 thus selected is acquired by the unit/signal path selection section 42 shown in FIG. 10, and is sent to the system configuration status design section 45 of the data processing section 22. The arrangement position of the unit 2 is acquired by the position information acquisition section 43, and is sent to the system configuration status design section 45.

Next, the user connects a plurality of arranged units 2 with signal paths 1 (step 1205) via the input section 40 as follows. For example, the user selects a desired signal path 1 from the tool bar in the system window 23 and arranges it between the units 2 with the mouse. The signal paths 1 thus selected are acquired by the unit/signal path selection section 42. The position information on the arranged signal paths 1 is acquired by the position information acquisition section 43 and is sent to the system configuration status design section 45 of the data processing section 22.

In this manner, the system configuration status design section 45 of the data processing section 22 designs the configuration status of each unit 2 of the system S, based on the data sent from the unit/signal path selection section 42 and the position information acquisition section 43. And, the system configuration status design section 45 formats this configuration status and stores it in the system design data storage section 28.

Then, from the input section 40, the user specifies the attributes of the units 2 in a dialog box (step 1206) as follows. First, the user checks if the attribute to be specified already exists (step 1207). If it is, the user selects the one stored in the menu in the dialog (step 1208). For example, the user selects a unit with the mouse and, in the dialog that is started, specifies the attributes. The attributes are defined in the unit database 29.

The attributes may be specified not by using a dialog, but in the following manner. That is, from the window containing a plurality of previously-prepared units each with an attribute, the user may drag and drop a unit 2 with the desired function to paste it in the work space of the network editor.

In contrast, if the user finds that the attribute does not exist, the user creates it (step 1209). A newly-created attribute is added to the menu in the dialog box. It is added also to the unit database 29 and the unit library 30 (step 1210).

When the attribute of a unit 2 is specified, it is necessary to edit the design information stored in the unit database 29 according to the attribute, meaning that design information editing is performed for each unit 2 (step 1211). To do editing processing for a unit 2, the function editor corresponding to the attribute of the unit 2 is started. For any type of attribute, the function editor must be started by a single operation.

If the attribute of the unit 2 is not specified or if the unit 2 has a hierarchical structure, steps 1202–1210 are recursively executed to select the network editor 25 as the function editor (indicated by the terminal symbol A in FIG. 12). In this case, one additional network editor 25 is started in the system-build system 20.

The user must start the rule editor 26 for a unit 2 having the fuzzy inference function. Starting the rule editor 26 displays the screen of the rule editor 26. In this embodiment, the user is able to run the rule editor 26 with a mouse to specify a plurality of IF-THEN rules.

The user is required to specify the condition labels corresponding to the input/output variable names by pressing the variable/label setup buttons with the use of the mouse. The variable/label setup section 62 of the rule editor 26, shown in FIG. 9, sends the condition labels to the display data storage section 61 and adds them to the drop-down menu.

Figure 14:
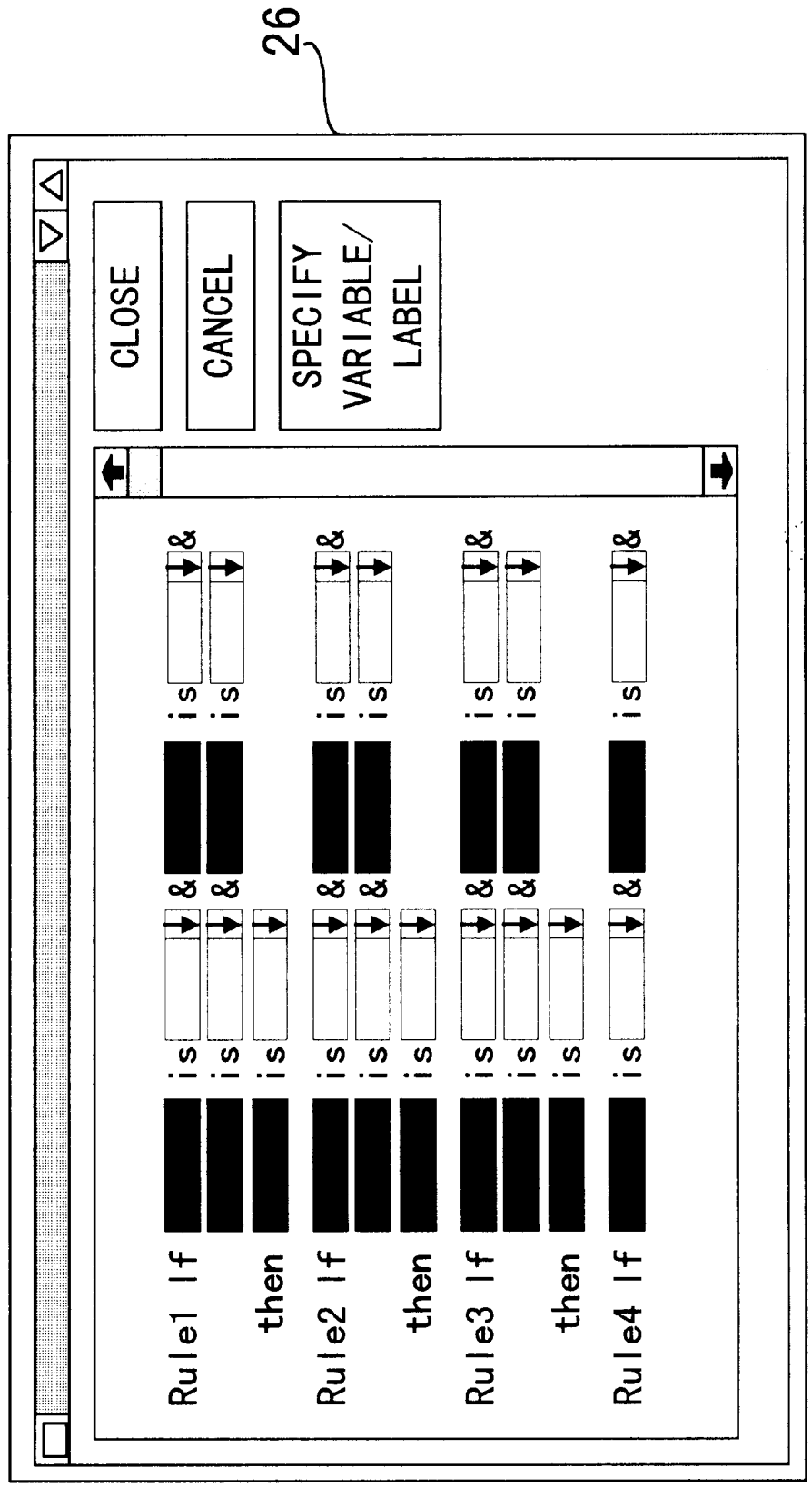
FIG. 14 is a diagram showing an example of screen display of the rule editor 26 used in the embodiment.

The rule editor 26 allows the user to change the display according to the dimensions and the names of input/output variables. On the screen shown in FIG. 14, the input data is four-dimensional (x1, x2, x3, x4) and the output data is one-dimensional (y1). First, the user displays the drop-down menu in the top-left corner of the screen and selects a desired IF-THEN rule. Thus, the user can create a set of IF-THEN rules simply by selecting the condition labels for a desired IF-THEN rule from the drop-down menu. The user can select labels from the drop-down menu again to change a selected label.

What the user has entered with the use of the rule editor 26, that is, the design information on the units 2, such as fuzzy inference information, is sent to the system configuration status design section 45 of the data processing section 22 via the rule setup section 60, and is stored in the system design data storage section 28.

Figure 15:
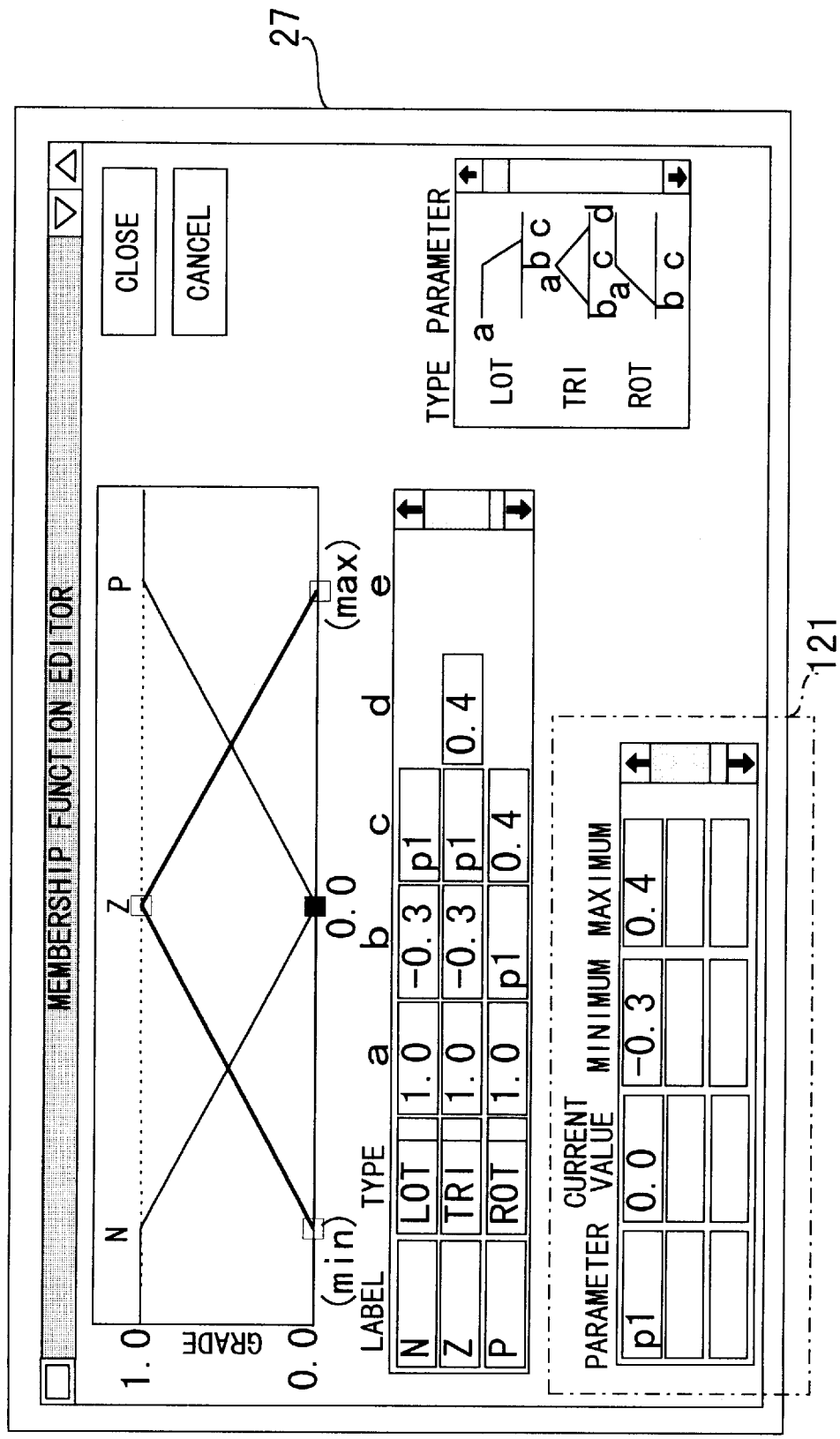
FIG. 15 is a diagram showing an example of screen display of the membership function editor 27 used in the embodiment.

For a unit 2 using a membership function, the user need to start the membership function editor 27. This causes the screen of the membership function editor 27 to be displayed as shown in FIG. 15. On this screen, the user specifies the above-mentioned "labels" and the "type" of each "label", and parameters.

In the figure, there are four parameters for the membership function in bold type (the name is "Z"): y-coordinate of the vertex of a cone, x-coordinate of the left end of the base, x-coordinate of the vertex, and x-coordinate of the right end of the base. The user specifies these values directly from the keyboard or by manipulating the graph, shown in the top half of the screen, with the mouse.

The specified labels are acquired by the label setup section 70 shown in FIG. 10, the types are acquired by the type setup section 71, and the parameters are acquired by the parameter setup section 72. They are then sent to the display data storage section 73, and the corresponding screens are displayed. They are also sent to the system configuration status design section 45 and stored in the system design data storage section 28.

Note that, in the above example, the membership function editor 27 has the learning value setup section 121. This learning value setup section 121 may be implemented, not as a part of the membership function editor 27, but as an independent window. The learning value setup section 121 enables the user to define the learning value list LPL, one of design information common items of a unit 2. Thus, the parameters defined as the learning value list LPL may be used as the parameters for specifying the type of the above membership function.

After steps 1204 to 1211 are executed, the user checks if the design of the system S, which is being edited by the network editor 25, has been ended (step 1212). If not, the user repeats steps 1204 to 1212.

When the user finishes the above processing for the units 2, the user specifies the operation sequence of all the units 2 (step 1213). That is, the user specifies the operation sequence of units 2 from the input section 40 with the use of the network editor 25. For example, the user specifies the units 2, one at a time, on the screen of the network editor 25, shown in FIG. 13, with the use of the mouse. The operation sequence setup section 49 acquires the specified sequence and sends it to the system design data storage section 28 via the operation sequence processing section 50.

In the above description, the user manually specifies the operation sequence via the input section 40. However, the user is able to allow the data processing section 22 to decide the operation sequence automatically according to how units 2 are connected. For example, when the operation is performed as shown in FIG. 4(*a*), the units 2 may be executed from left to right, and top to bottom, on the network editor 25 screen.

The user executes the steps in the unit design block as described above. Then, the user checks if the design operation on the whole system S and, if there is one or more hierarchically-structured units 2, on those units 2 have been completed (step 1212). If there is a unit not yet designed, the user returns to the unit design block and repeats steps 1204–1213 for that unit. If the user finds that all the units have been designed, the user ends the design operation.

When the design operation on the whole system S has been completed, the target system conversion section 31 shown in FIG. 7 links the design information stored in the system design data storage section 28 with the definitions stored in the unit library 30 to convert the target system S to the execution program 32 (step 1215). To do so, the user, for example, selects an item from the pull-down menu on the screen shown in FIG. 11 to start the target system conversion section 31. This step completes the system-build process.

Figure 16:
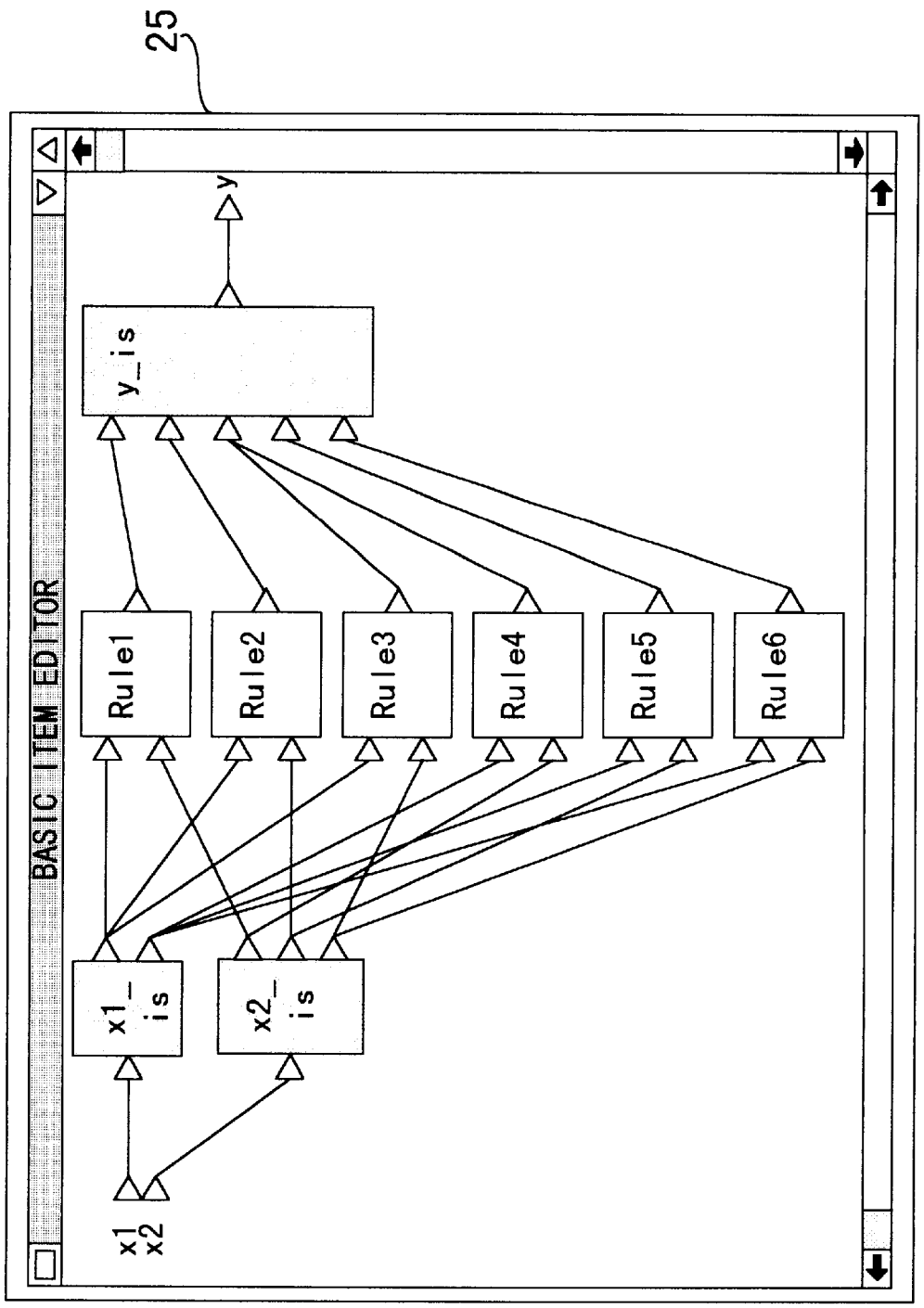
FIG. 16 is a diagram showing an example of screen display of the network editor 25 used in the embodiment.

FIG. 16 shows an example of what the network editor 25 displays when the execution program 32, generated in the above-described system S design process, is executed. In the figure, the name of each unit 2 is shown in text. Of the nine units 2 shown in the figure, assume that only the units 2 named "x1_is", "x2_is", and "y1_is" have the learning value list LPL.

In this case, those units 2 having the learning value list LPL may be displayed in a different color as shown in FIG. 16, or they may be marked with a symbol such as a circle, to distinguish them from other units 2. This tells the user which parts of the system S perform learning. This is done by the internal status acquisition section 51 of the data processing section 22, shown in FIG. 8, which gets the internal status information on the execution program 32 via the communication section 33 and sends it to the display data storage section 44.

Figure 17:
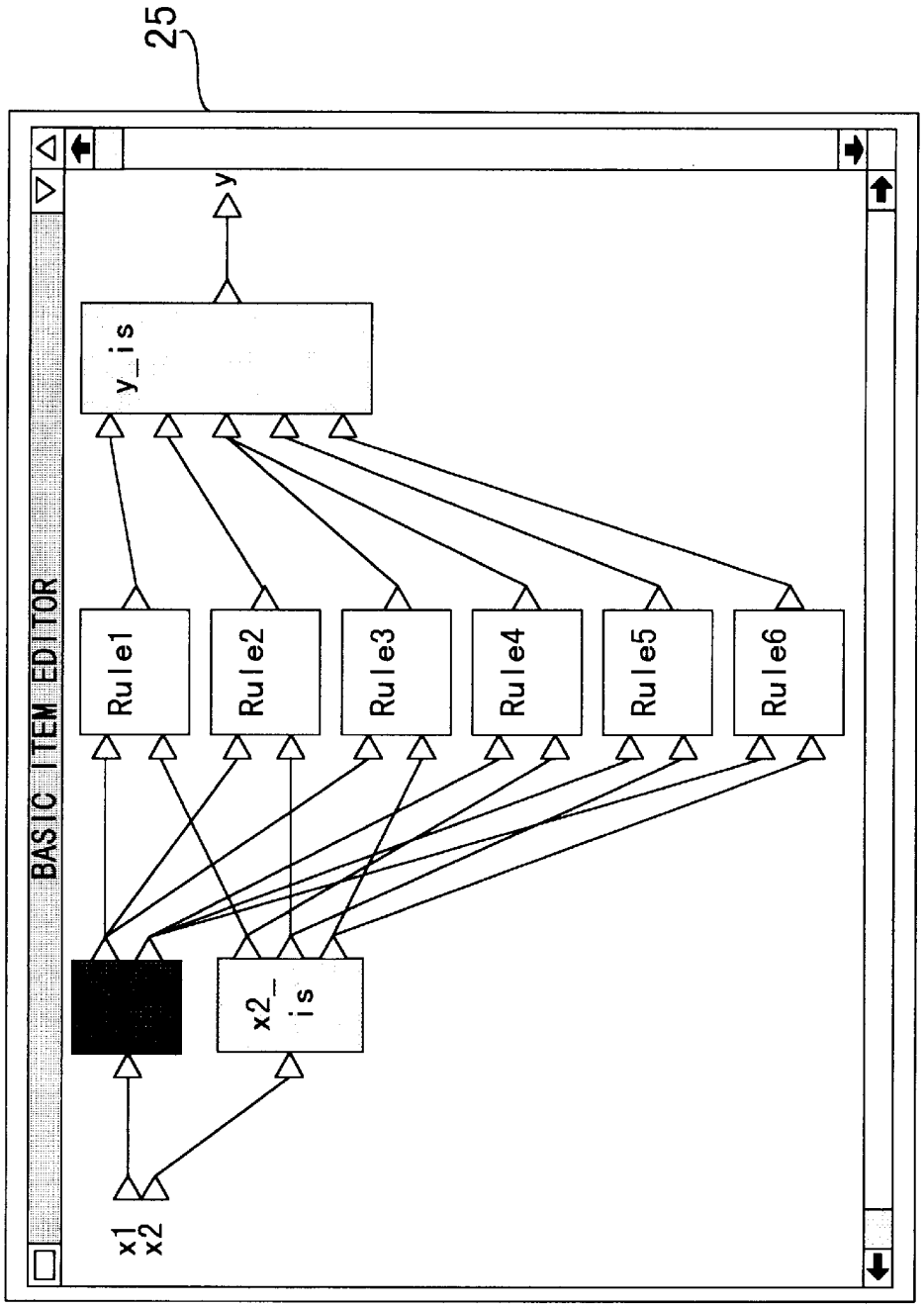
FIG. 17 is a diagram showing an example of screen display of the network editor 25 used in the embodiment.

To tell the user in real time that internal parameters are changing during learning, those units 2 whose parameters are changing may be displayed in a different color. For example, of those three units 2 having the learning value list LPL shown in FIG. 17, the parameters of only "x1_is" are changing. This gives the user information on which part of the system S contributes to the performance of the system S.

Figure 18:
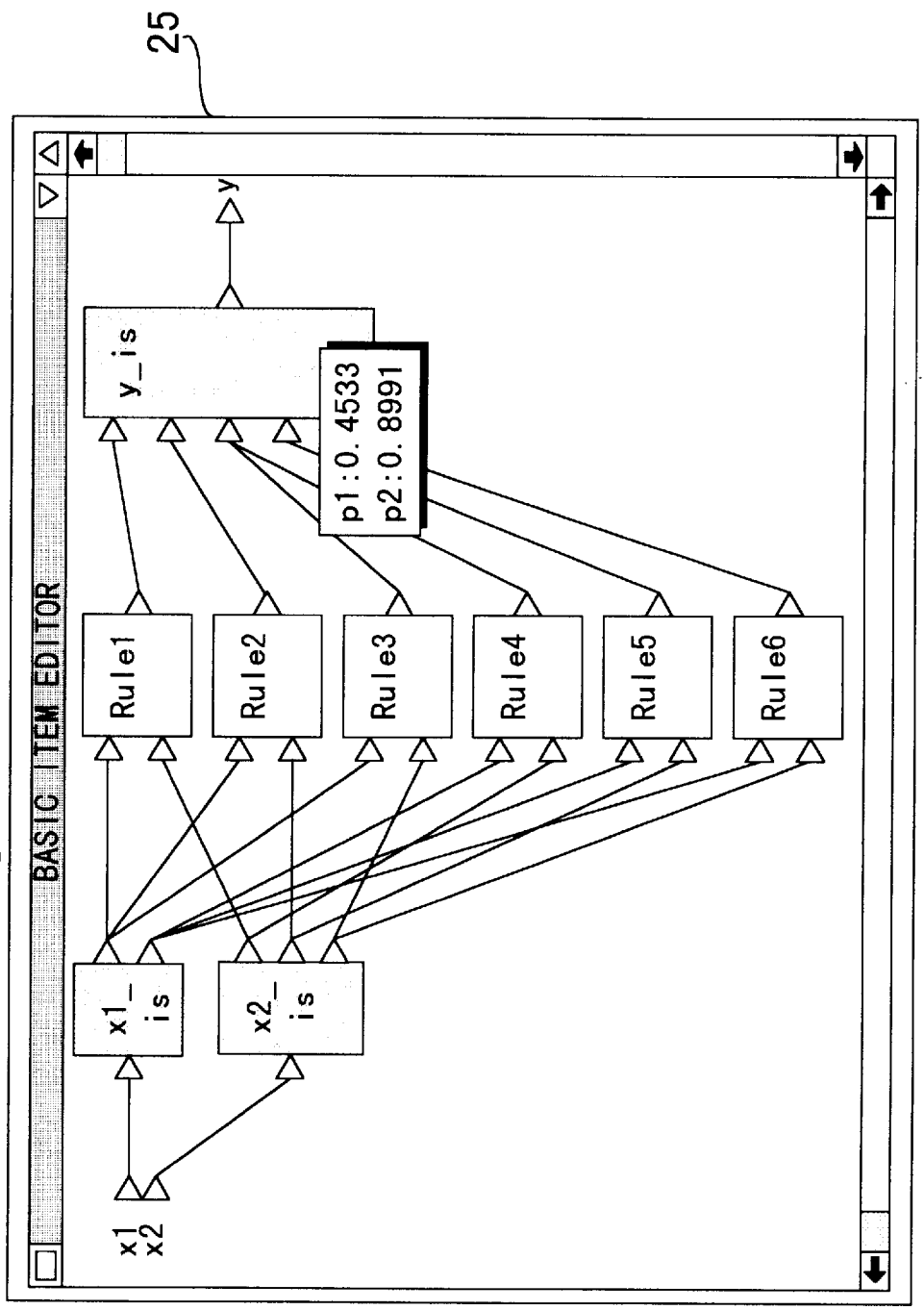
FIG. 18 is a diagram showing an example of screen display of the network editor 25 used in the embodiment.

To allow the user to visually check the values of learning parameters, the system may be designed so that the user can click on a unit 2 including the parameters to display their contents, as shown in FIG. 18. That is, while holding the mouse button, the window appears as a pop-up screen and the contents of the parameters are displayed. When the user releases the mouse button, the window disappears.

Special operations may be associated with the mouse buttons to produce special display effects. For example, with a two-button mouse, the system may be designed so that pressing both buttons keeps the window displayed even if they are released. This enables the user to display only the necessary information, preventing the screen from being cluttered.

Figure 19:
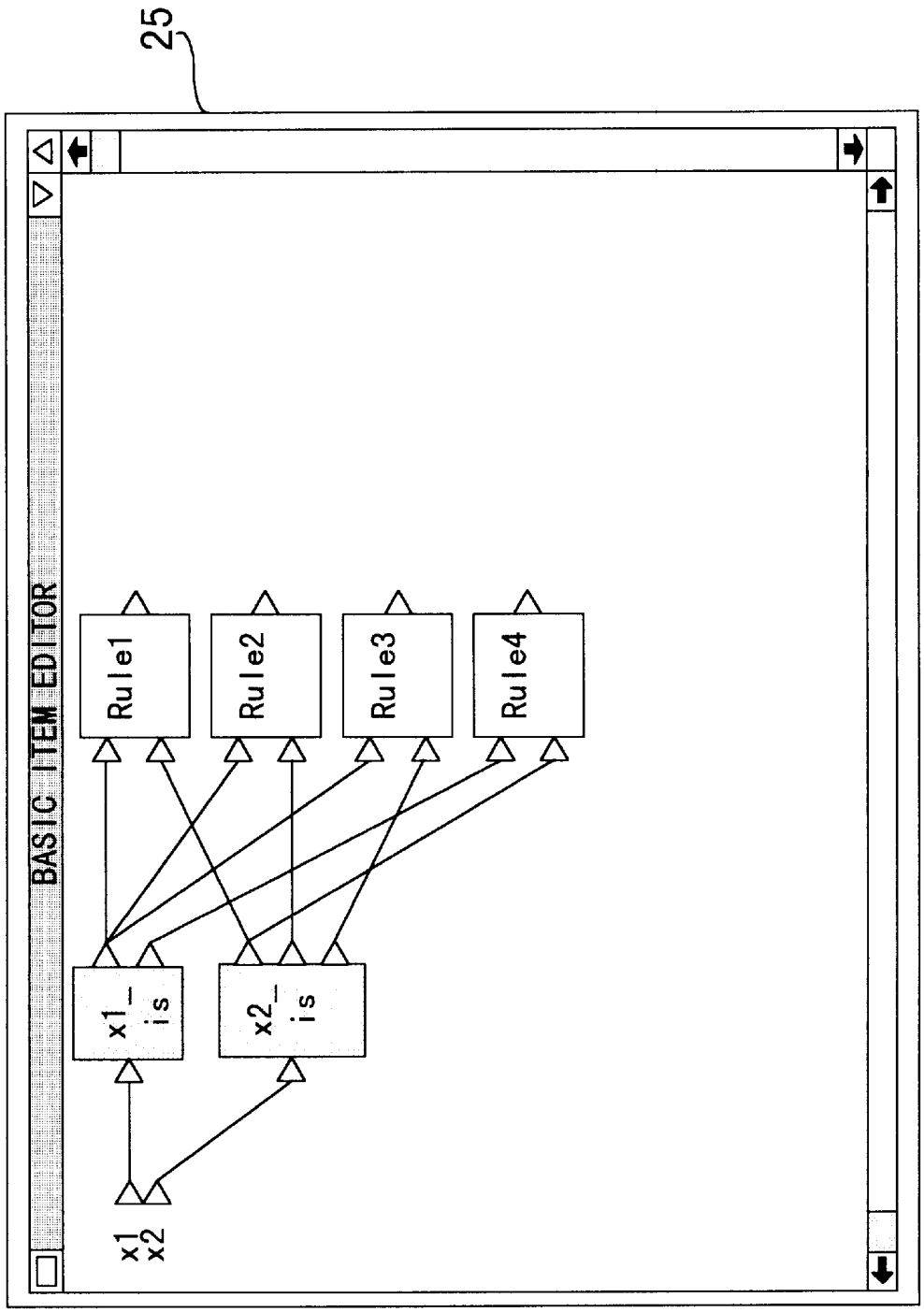
FIG. 19 is a diagram showing an example of screen display of the network editor 25 used in the embodiment.

In addition, because each unit 2 has the learning function, learning need not be done after the whole system S is designed; instead, learning may be done, during the design process, only for the units 2 already arranged. For example, when some units 2 and signal paths 1 are arranged as shown in FIG. 19, the execution program 32 may be executed based on the information, collected up to that moment, to allow the user to visually check the learning results.

From the above discussion, it is apparent that an embodiment according to this invention has the following advantages. First, because each unit 2 has a plurality of function editors according to what it does, the function of each unit may be implemented efficiently and flexibly.

In addition, because each unit 2 is assigned with a specific function and has the built-in learning function with the user of the network editor 25, the user is able to design the system S simply by arranging the units 2, and then connecting them with signal paths 1. This makes it possible for the user to build the system S, step by step, while modifying it as necessary.

The target system S, which is converted to the execution program 32 by the target system conversion section 31, is implemented as a function separate from the system-build system 20. This eliminates the need for the system-build system 20 after the system S is built, enabling the system S to run independently and speedily.

(3) Other Embodiments

This invention is not limited to the above embodiment but may be embodied in other specific forms without departing from the spirit or essential characteristics thereof. For example, the number of units 2 and their structures may be modified, and the operation procedure for generating output signals from input signals, the concrete parameters specifying the relationship between input signals and output signals, and the procedure for updating parameters and learning the relationship between input and output parameter values may be set up freely. An algorithm to be used by a unit for operation and learning is not limited to the back propagation method; other methods such as the conjugate gradient method may be used instead.

The control section 3 of the system S may use another form of control; that is, it may use various types of control mechanism such as the wired logic mechanism. Operation messages are not limited to forward, backward, and modification processing instructions. Other types of messages such as initialization instructions may also be used. In addition, operation messages may be sent, not only to units 2, but also to signal paths 1.

Depending upon the learning (modification) algorithm, the forward or backward operation may be performed based not only on the parameters PRM but also on the modification information MDIS. The system S according to this invention may be implemented not only on a general-purpose computer but also on a hardware unit such as a special-purpose logic circuit.

Also, the execution program 32 for the system S need not necessarily be implemented as an independent program; it may be implemented as a part of the system-build system 20. For example, the system-build system 20 may contain a function which implements all the units 2 from the system S design information stored in the system design data storage section 28.

Information such as system S design information need not be stored always in the storage means in the system-build system 20. It may be stored in an external storage means or may be entered over a communication line.

Embodiments (1) First Embodiment

The following explains a method for arranging units 2 and signal paths 1 with the use of the network editor 25. In the description that follows, the system S shown in FIG. 13 is built.

First, the user specifies the dimensions of input/output data used in the system. Here, assume that the input data is x1 and x2 and that the output data is y. Next, the user selects desired units 2 and signal paths 1 using the tool bar on the screen. As shown in the figure, the user selects nine units 2 and twenty-one signal paths 1.

Next, the user specifies the input terminals 5 and output terminals 6 of the units 2 from the input section 40 to set up the information on units 2, that is, the dimensions of input/output data. Next, the user connects the input terminals 5 and output terminals 6 to set up the connections between units 2 and signal paths 1.

Figure 13:
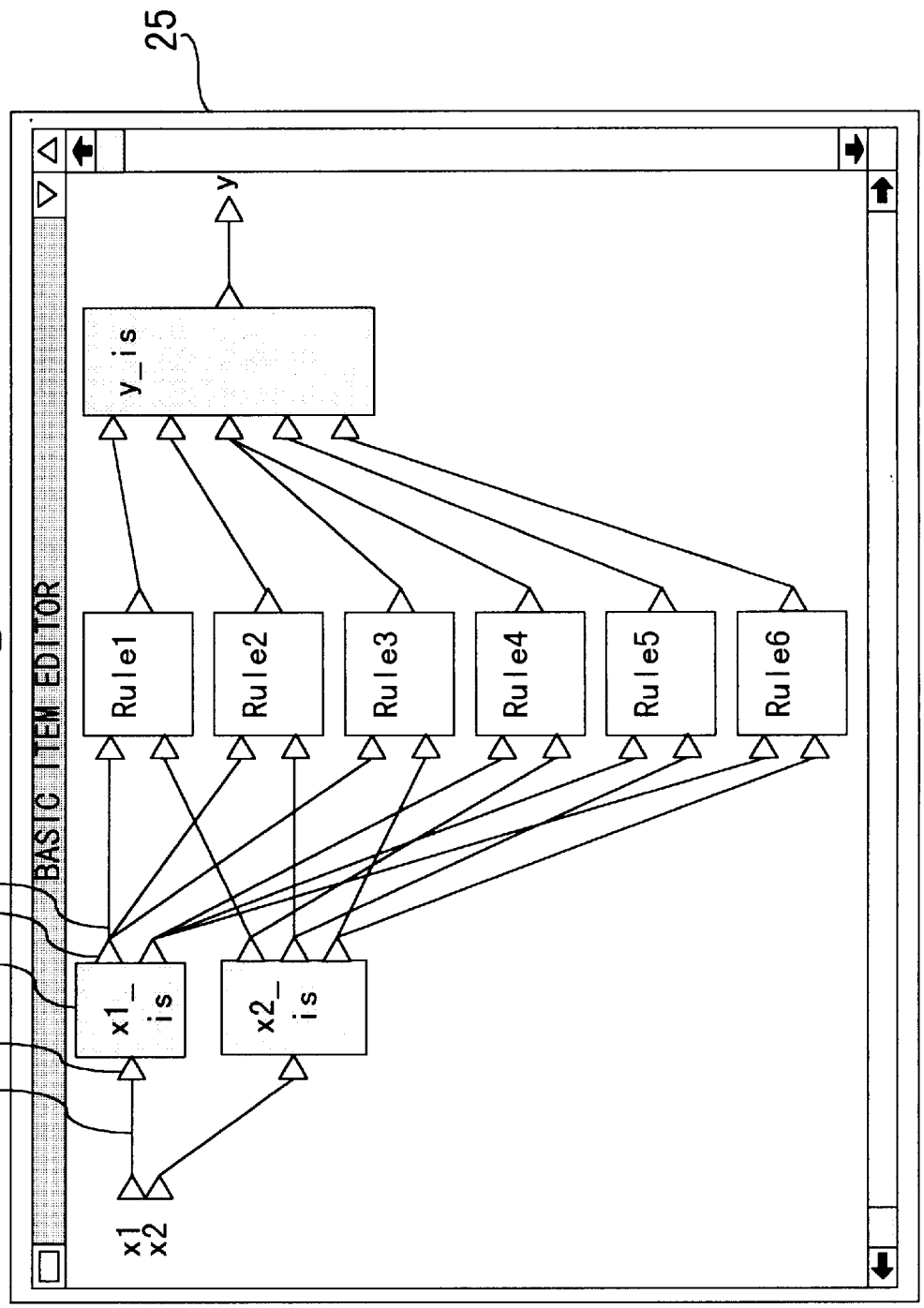
FIG. 13 is a diagram showing an example of screen display of the network editor 25 used in the embodiment.

The network shown in FIG. 13 is configured as described above. FIG. 20 shows an example of the above network definition coded in the network description language. In this example, the unit names are "x1_is", "x2_is", "Rule1"–"Rule6", and "y_is". And, the input for the unit 2 "x1_is" is "in", and the output for it is "out1" and "out2"; the input for the unit 2 "x2_is" is "in", and the output for it is "out1", "out2", and "out3".

For the first signal path 1, the input x1 is connected to the input "in" of the unit 2 "x1_is"; for the second signal path 1, the input x2 is connected to the input "in" of the unit 2 "x2_is".

The connection status information on the units 2 and signal paths 1 that is set up as described above is stored in the system design data storage section 28, shown in FIG. 7, as the connection information table. FIG. 21 shows an example of the connection information table.

(2) Second Embodiment

In this embodiment, units are used in fuzzy inference operations or neutral networks. The method of steepest descent is used in the modification operation in this embodiment.

In the following discussion, the forward input signal FWIS in all the units 2 is expressed as n-dimensional x, and the forward output signal FWOS is expressed as r-dimensional y. Also, the backward input signal BWIS during the backward operation is r-dimensional y which is expressed as $e^y$. Similarly, the backward output signal BWOS is n-dimensional x which is expressed as $e^x$. That is, during the backward operation, error information (error signal) flows as follows:

[Formula 1]

$$e^y \rightarrow e^x \quad (1)$$

(corresponds to the backward input signal and backward output signal, respectively)

The generation operation (backward operation) is performed, assuming that the parameters are modified by the method of steepest descent. If the operation processing (forward operation) is expressed as:

[Formula 2]

$$y = f(x) \quad (2)$$

then,

[Formula 3]

$$e^x = f(x)e^y \quad (3)$$

When the forward operation parameter is expressed as a, the modification processing is:

[Formula 4]

$$a[k+1] = a[k] + \delta a[k] \quad (4)$$

$$\delta a[k] = -\eta \sum \frac{\partial f(x,a)}{\partial a} e^x + \beta \delta a[k-1]$$

where, $\eta$ and $\beta$ are learning coefficients (constants). $\Sigma$ indicates the accumulation of the modification amount for the number of sets (N) of the input/output data set DS.

The following explains the processing for each type of signal path and unit:

Signal path: LINK

A signal travels from the input side to the output side through this signal path which has the internal load of w. The forward operation processing is expressed as:

[Formula 5]

$$y = w \cdot x \quad (5)$$

The backward operation processing is expressed as:

[Formula 6]

$$e^x = w \cdot e^y \quad (6)$$

Let $\eta$ and $\beta$ be learning coefficients. Then, the modification processing is expressed as:

[Formula 7]

$$w[k+1] = w[k] + \delta w[k] \quad (7)$$

$$\delta w[k] = -\eta \sum x e^x + \beta \delta w[k-1]$$

Virtual path: VLINK

A signal travels from the input side to the output side through this signal path without modification. The forward operation processing is expressed as:

[Formula 8]

$$y = x \quad (8)$$

The backward operation processing is expressed as:

[Formula 9]

$$e^x = e^y \quad (9)$$

Branch unit: FANOUT

This unit divides one input signal into r output signals. The unit performs the reverse function of the sum unit. The forward operation processing is expressed as:

[Formula 10]

$$y_i = x, i = 1, \ldots, n \quad (10)$$

The backward operation processing is expressed as:
[Formula 11]

$$e^x = \Sigma_i' e^y \tag{11}$$

Product unit: PI
This unit calculates the algebraic product of n input signals and outputs the result. The forward operation processing is expressed as:
[Formula 12]

$$y = \Pi_i^n x_i \tag{12}$$

The backward operation processing is expressed as:
[Formula 13]

$$e_i^x = \Pi_{j \ne 1} x_j \cdot e^y, i=1, \ldots, n \tag{13}$$

Sum unit: SUM
This unit calculates the algebraic sum of n input values and outputs the result. The forward operation processing is expressed as:
[Formula 14]

$$y = \Sigma_i^n x_i \tag{14}$$

The backward operation processing is expressed as:
[Formula 15]

$$e_i^x = e^y, i=1, \ldots, n \tag{15}$$

MAX unit: MAX
This unit outputs the maximum of n input values. The forward operation processing is expressed as:
[Formula 16]

$$y = \max_i x_i \tag{16}$$

The backward operation processing is expressed as:
[Formula 17]

$$e_i^x = \begin{cases} e^y, & \text{if } y = x_i \\ 0, & \text{otherwise} \end{cases} \tag{17}$$

MIN unit: MIN
This unit outputs the minimum of n input values. The forward operation processing is expressed as:
[Formula 18]

$$y = \min_i x_i \tag{18}$$

The backward operation processing is expressed as:
[Formula 19]

$$e_i^x = \begin{cases} e^y, & \text{if } y = x_i \\ 0, & \text{otherwise} \end{cases} \tag{19}$$

VERY unit: VERY
This unit calculates the square of the input value and outputs the result. The forward operation processing is expressed as:
[Formula 20]

$$y = x^2 \tag{20}$$

The backward operation processing is expressed as:
[Formula 21]

$$e^x = 2x \cdot e^y \tag{21}$$

NOT unit: NOT
This unit outputs the negation of the input value. The forward operation processing is expressed as:
[Formula 22]

$$y = 1 - x \tag{22}$$

The backward operation processing is expressed as:
[Formula 23]

$$e^x = -e^y \tag{23}$$

Weighted arithmetic unit: WA
This unit calculates and outputs the weight point. When the input data is a singleton, the unit calculates the weighted average. The input values include x and n-dimensional w. When the input value is a singleton, the forward operation processing is expressed as:
[Formula 24]

$$y = \frac{\sum x \cdot w}{\sum w} \tag{24}$$

When x is a singleton, the backward operation processing is expressed as:
[Formula 25]

$$e_i^x = \frac{w_i}{\sum_j w_j} e^y \tag{25}$$

$$e_i^w = \frac{x_i - y}{\sum_j w_j} e^y$$

Neuron unit: NEU
This unit is a neuron element, and the output function f is, for example, a sigmoid function. The forward operation processing is expressed as:
[Formula 26]

$$y = f(\Sigma_i x_i) \tag{26}$$

The backward operation processing is expressed as:
[Formula 27]

$$e_i^x = f'(\Sigma_i x_i) e^y \tag{27}$$

The sigmoid function unit: SGM
This unit performs the sigmoid function. The forward operation processing is expressed as:
[Formula 28]

$$y = \frac{1}{1 + \exp(-x)} \tag{28}$$

The backward operation processing is expressed as:
[Formula 29]

$$e^x = y(1-y) e^y \tag{29}$$

Figure 22:
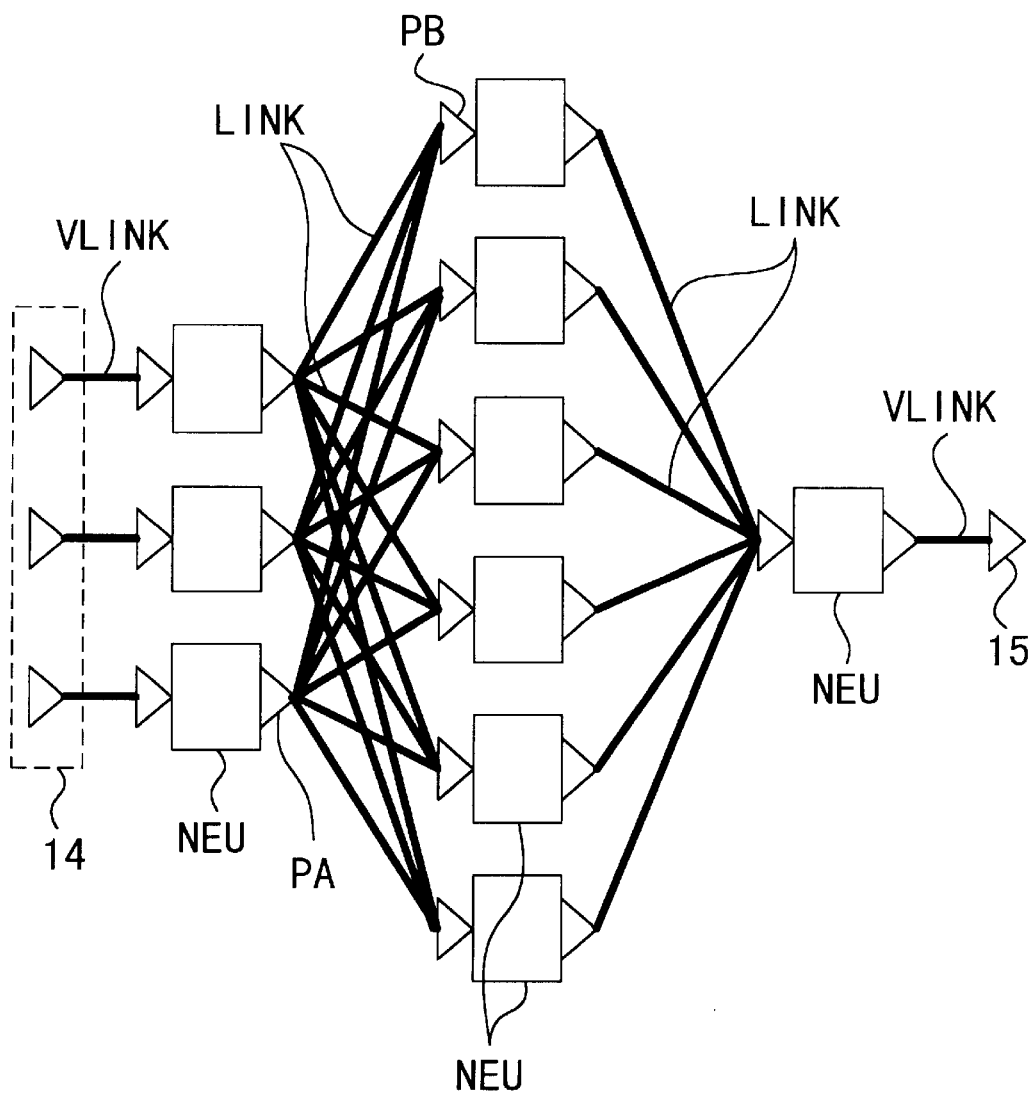
FIG. 22 is a conceptual diagram showing an example of a three-layer neural network configured using each unit in the second embodiment of this invention.

The following shows an example of neural network where above-mentioned signal paths and units are used. FIG. 22 is a conceptual diagram showing an example of a 3-layer neural network composed of the units described above. The symbol 14 represents the input terminals, and the symbol 15 represents the output terminal, of the whole neural network.

Although not shown in the diagram, the branch unit FANOUT is next to the downstream terminal, and the sum unit SUM is next to the upstream terminal, of each unit.

(3) Third Embodiment

In this embodiment, a network implementing the simplified fuzzy inference is configured. A system, which automatically adjusts membership functions, is built using teacher data produced by the method of steepest descent.

Assume that, in the simplified fuzzy inference, the observation value v is a condition and that the control input value u is a conclusion, where y is a n-dimensional vector and u is an m-dimensional vector.

And, for the condition
[Formula 30]

$$y_i(n=1,\ldots,n) \tag{30}$$

$m_i$ membership functions are defined as follows:
[Formula 31]

$$\mu_{ij}(i=1,\ldots,m) \tag{31}$$

For the output value u
[Formula 32]

$$U_{ij}(i=1,\ldots,m) \tag{32}$$

$p_i$ real values (singleton) are defined as follows:
[Formula 33]

$$\sigma(i=1,\ldots,p_i) \tag{33}$$

At this time, r rules
[Formula 34]

$$R^1,\ldots,R^r \tag{34}$$

are defined as follows:
[Formula 35]

$$R^1: \text{IF } y_1 \text{ is } A_1^1 \& \ldots \& y_n \text{ is } A_n^1 \text{ THEN } u_1 \text{ is } B_1^1 \& \ldots \& u_m \text{ is } B_m^1 \tag{35}$$
$$\vdots$$
$$R^r: \text{IF } y_1 \text{ is } A_1^r \& \ldots \& y_n \text{ is } A_n^r \text{ THEN } u_1 \text{ is } B_1^r \& \ldots \& u_m \text{ is } B_m^r$$

The label for the condition portion
[Formula 36]

$$A_i^k(k=1,\ldots,r) \tag{36}$$

is assigned to one of the following membership functions.
[Formula 37]

$$\mu_{i1},\ldots,\mu_{im_i} \tag{37}$$

Similarly, the label for the conclusion portion
[Formula 38]

$$B_i^k(k=1,\ldots,r) \tag{38}$$

is assigned to one of the following real values:
[Formula 39]

$$\sigma_{i1},\ldots,\sigma_{ip_i} \tag{39}$$

If there are the inference rules as described above, the following procedure is used to derive a result when an condition is entered:

First, the adaptability of each rule
[Formula 40]

$$\omega_k(k=1,\ldots,r) \tag{40}$$

is calculated.
[Formula 41]

$$\omega_k = \prod_{i=1}^{n} \mu_{A_i^k}(y_i) \tag{41}$$

where,
[Formula 42]

$$\mu_{A_i^k}(y_i) \tag{42}$$

is a membership function assigned to the label:
[Formula 43]

$$A_i^k \tag{43}$$

Then, the conclusion is produced by combining:
[Formula 44]

$$\mu_i = \frac{\sum_{k=1}^{r} \sigma_{B_i^k} \cdot \omega_k}{\sum_{k=1}^{r} \omega_k} \tag{44}$$

where,
[Formula 45]

$$\sigma_{B_i^k} \tag{45}$$

is a real value assigned to the label:
[Formula 46]

$$B_i^k \tag{46}$$

In building the system, let n=4 and m=1, and let the rules be the following 16 (r=16) rules:
[Formula 47]

$$R^1: \text{IF } y_1 \text{ is } A_1^1 \& y_2 \text{ is } A_2^1 \& y_3 \text{ is } A_3^1 \& y_4 \text{ is } A_4^1 \text{ THEN } u \text{ is } B^1 \tag{47}$$
$$R^2: \text{IF } y_1 \text{ is } A_1^1 \& y_2 \text{ is } A_2^1 \& y_3 \text{ is } A_3^1 \& y_4 \text{ is } A_4^2 \text{ THEN } u \text{ is } B^2$$
$$R^3: \text{IF } y_1 \text{ is } A_1^1 \& y_2 \text{ is } A_2^1 \& y_3 \text{ is } A_3^2 \& y_4 \text{ is } A_4^1 \text{ THEN } u \text{ is } B^3$$
$$R^4: \text{IF } y_1 \text{ is } A_1^1 \& y_2 \text{ is } A_2^1 \& y_3 \text{ is } A_3^2 \& y_4 \text{ is } A_4^2 \text{ THEN } u \text{ is } B^4$$
$$\ldots$$
$$R^{16}: \text{IF } y_1 \text{ is } A_1^2 \& y_2 \text{ is } A_2^2 \& y_3 \text{ is } A_3^2 \& y_4 \text{ is } A_4^2 \text{ THEN } u \text{ is } B^{16}$$

Figure 23:
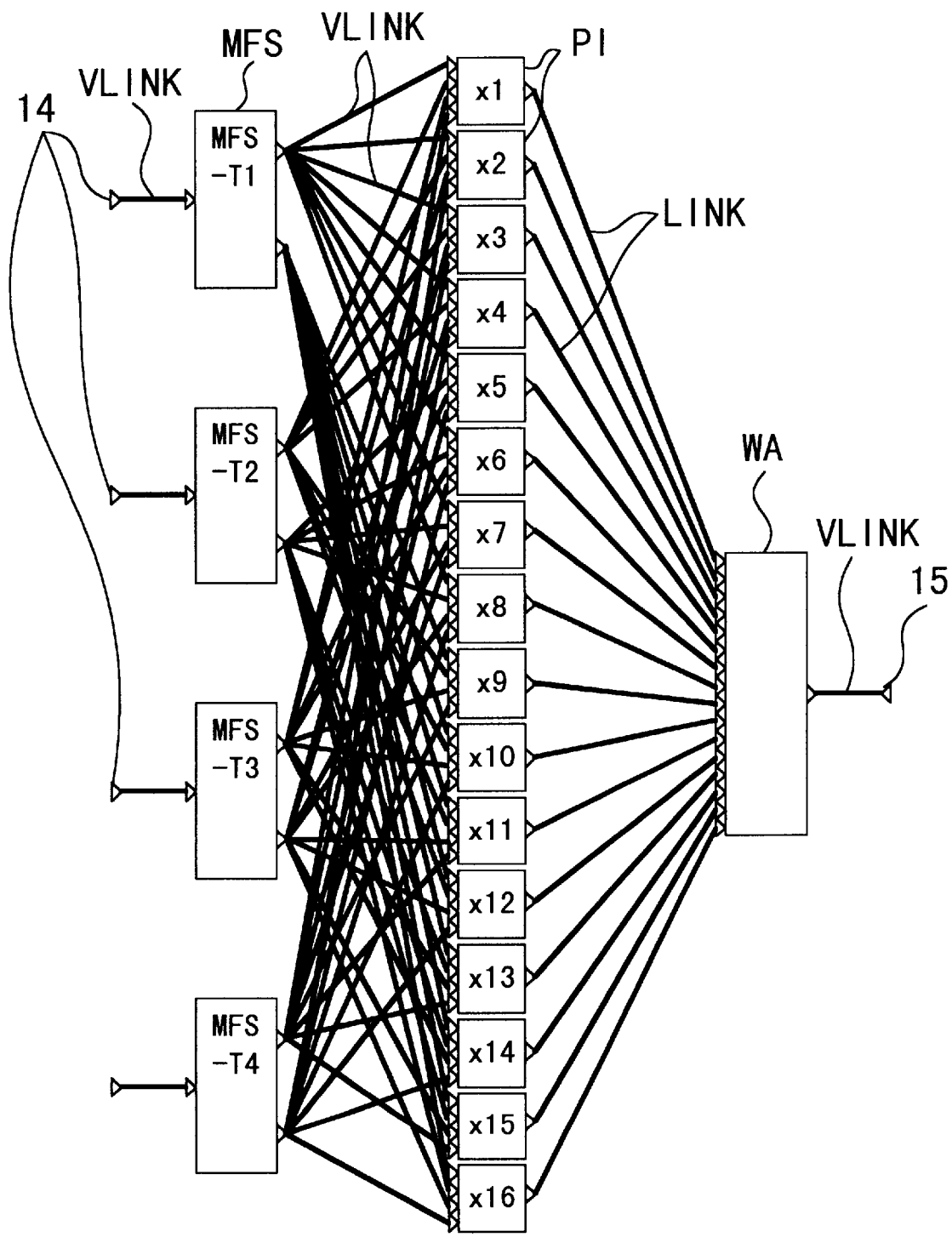
FIG. 23 is a conceptual diagram showing the system configuration used in the second embodiment of this invention.

Using the conditions described above, the system shown in FIG. 20 is built. FIG. 23 is a conceptual diagram showing the configuration of the system in the third embodiment.

In this figure, x represents each rule, and MFS represents a newly-defined unit which has a function of evaluating the proposition of the condition portion and has membership functions. Assume that sigmoid function types are used for the membership functions. Then, the following can be defined:

A function evaluates the following propositions:
[Formula 48]

$$x \text{ is } A^1 \tag{48}$$

and
[Formula 49]

$$x \text{ is } A^2 \qquad (49)$$

Forward operation processing is:
[Formula 50]

$$y_j = \mu_{A^j}(x), j = 1, 2 \qquad (50)$$

$$\mu_{A^1} = \frac{1}{1 + \exp\{-a1(x - b1)\}}$$

$$\mu_{A^2} = 1 - \frac{1}{1 + \exp\{-a2(x - b2)\}}$$

Backward operation processing is:
[Formula 51]

$$e^x = e_1^x + e_2^x$$

$$e_1^x = a1 \cdot y_1(1 - y_1)e_1^y$$

$$e_2^x = a2 \cdot y_2(1 - y_2)e_2^y$$

$$e_1^a = (x - b1)y_1(1 - y_1)e_1^x$$

$$e_1^b = a1 y_1(1 - y_1)e_1^x$$

$$e_2^a = (x - b2)y_2(1 - y_2)e_2^x$$

$$e_2^b = a2 y_2(1 - y_2)e_2^x \qquad (51)$$

Modification processing is:
Let, $\eta_a$, $\eta_b$ and $\beta_a$, $\beta_b$ be learning coefficients. Then, modification processing is
[Formula 52]

$$aj[k+1] = aj[k] + \delta aj[k]$$

$$\delta aj[k] = -\eta_a \Sigma e_j^a + \beta_a \delta aj[k-1]$$

$$bj[k+1] = bj[k] + \delta bj[k]$$

$$\delta bj[k] = -\eta_b \Sigma e_j^b + \beta_b \delta bj[k-1]$$

$$j = 1, 2 \qquad (52)$$

EXAMPLE

Figure 24:
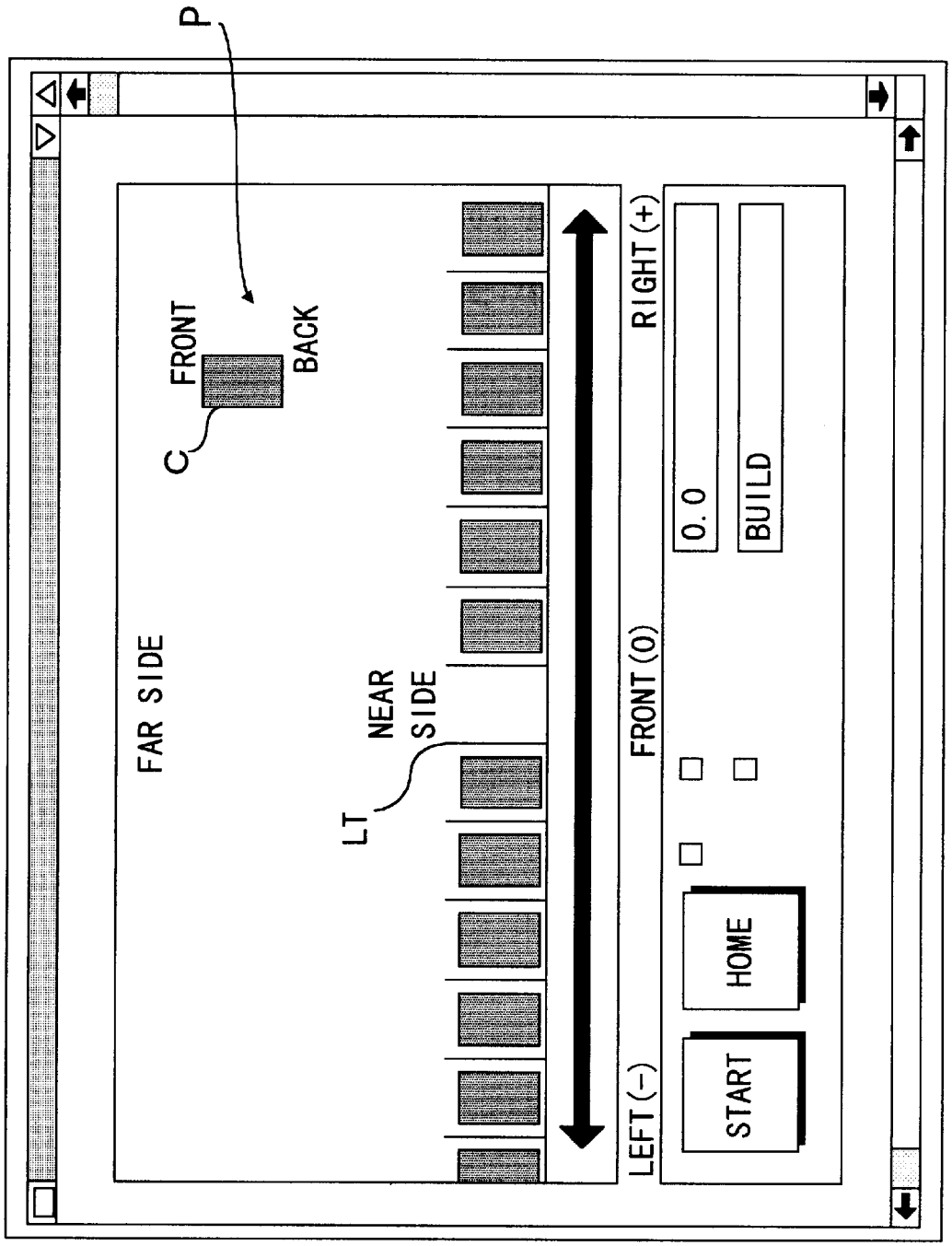
FIG. 24 is a diagram showing an example of screen display representing the initial status in the third embodiment of this invention.

The following shows an example of the third embodiment. In this example, a simplified fuzzy inference system is built to control the cars in a parking lot. In this system, the current location of cars, parking status of the parking lot, and their status after execution of the system are displayed on the screen. FIG. 24 shows the initial status. Now, using this system, the car C is backing into a vacant parking lot (LT). As shown in the figure, the car C is now at the position P and is going to park in the vacant lot LT.

In this system, the input value y is a two-dimensional vector and the output value u is a one-dimensional vector. They are defined as follows:
[Formula 53]

$y_i$:Left and right direction of the car in relation to the vacant lot $LT(-:\text{Left},+:\text{Right},0:\text{Front})$ $y_2$:Forward and backward direction of the car in relation to the vacant lot $LT(0:\text{Lot position})$ $u$:Target movement angle necessary for the car C to park in the desired position $\qquad (53)$ Assume that the car C moves at a constant speed. Also assume that the actual movement angle of the car C is controlled by the P-type control which uses the difference between the actual angle and the system-supplied target movement angle.

The fuzzy rule for the car C to enter the vacant lot LT is as follows:
[Formula 54]

$R^1$:IF $y_1$ is LEFT & $y_2$ is FAR THEN $u$ is RIGHT-BACK $R^2$:IF $y_1$ is LEFT & $y_2$ is MIDDLE THEN $u$ is RIGHT $R^3$:IF $y_1$ is LEFT & $y_2$ is NEAR THEN $u$ is RIGHT-FRONT $R^4$:IF $y_1$ is RIGHT & $y_2$ is FAR THEN $u$ is LEFT-BACK $R^5$:IF $y_1$ is RIGHT & $y_2$ is MIDDLE THEN $u$ is LEFT $R^6$:IF $y_1$ is RIGHT & $y_2$ is NEAR THEN $u$ is LEFT-PRONT $R^7$:IF $y_1$ is CENTER THEN $u$ is BACK $\qquad (54)$ According to this fuzzy rule, the car C once moves to the front of the vacant lot LT and then enters the vacant lot LT.

Figure 25:
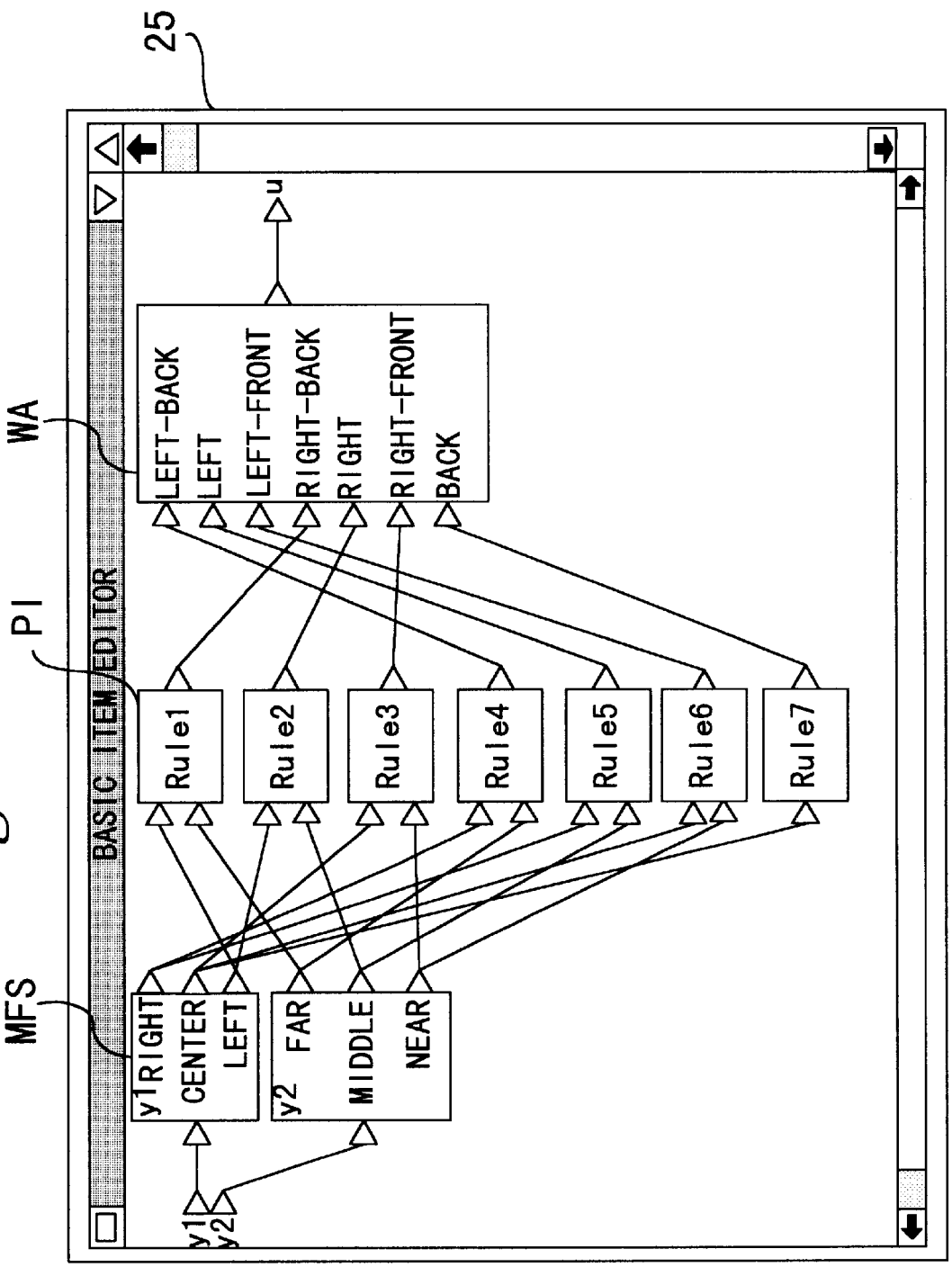
FIG. 25 is a diagram showing an example of screen display of the network editor 25 used in the embodiment.

A simplified fuzzy inference system is built, according to the procedure shown in the third embodiment, using the above-mentioned unit MFS, product unit PI, and weighted arithmetic unit WA. FIG. 25 shows an example of the screen displayed by the network editor 25 used to build this simplified fuzzy inference system. The membership function in the unit MFS, shown in the figure, is a triangle-type membership function.

There are the following three types of triangle-type membership functions. The first is a LOT type function which is a semi-trapezoid type membership function with the left end open.
[Formula 55]

$$y = f(x) = \begin{cases} a, & x < b \\ \dfrac{a(x-c)}{b-c}, & b \le x < c \\ 0, & c \le x \end{cases} \qquad (55)$$

where, a, b, and c are constants (a>0, c>b).

The second is a TRI type function which is a triangle type membership function.
[Formula 56]

$$y = f(x) = \begin{cases} 0, & x < b \\ \dfrac{a(x-b)}{c-b}, & b \le x < c \\ \dfrac{a(x-d)}{c-d}, & c \le x < d \\ 0, & d \le x \end{cases} \qquad (56)$$

where, a, b, c, and d are constants (a>0, d>c>b).

The third is a ROT type function which is a semi-trapezoid type membership function with the right end open.
[Formula 57]

$$y = f(x) = \begin{cases} 0, & x < b \\ \dfrac{a(x-b)}{c-b}, & b \le x < c \\ a, & c \le x \end{cases} \qquad (57)$$

where, a, b, and c are constants (a>0, c>b).

For each type of the above three, learning is performed on the constants a, b, c, and d. That is, they are modified by performing backward processing. In each unit MFS, the values are derived for each interval based on the formulas (3) and (4) described above. Although a boundary between intervals is undifferentiable in most cases, there is no problem in practice.

The following shows a formula representing the behavior of the above TRI type function in the interval $b \leq x < c$. Based on the formula (3), the backward operation processing is represented as follows:

[Formula 58]

$$e^x = f'(x)e^y \qquad (58)$$

$$= \frac{a}{c-b}e^y$$

Based on formula (4), the modification amounts $\delta a$, $\delta b$, and, $\delta c$ of the forward operation parameters a, b, and c are represented as follows:

[Formula 59]

$$\delta a[k] = -\eta \sum \frac{x-b}{c-b} e^x + \beta \delta a[k-1] \qquad (59)$$

$$\delta b[k] = -\eta \sum \frac{a(x-c)}{(c-b)^2} e^x + \beta \delta b[k-1]$$

$$\delta c[k] = \eta \sum \frac{a(x-b)}{(c-b)^2} e^x + \beta \delta c[k-1]$$

Figure 27:
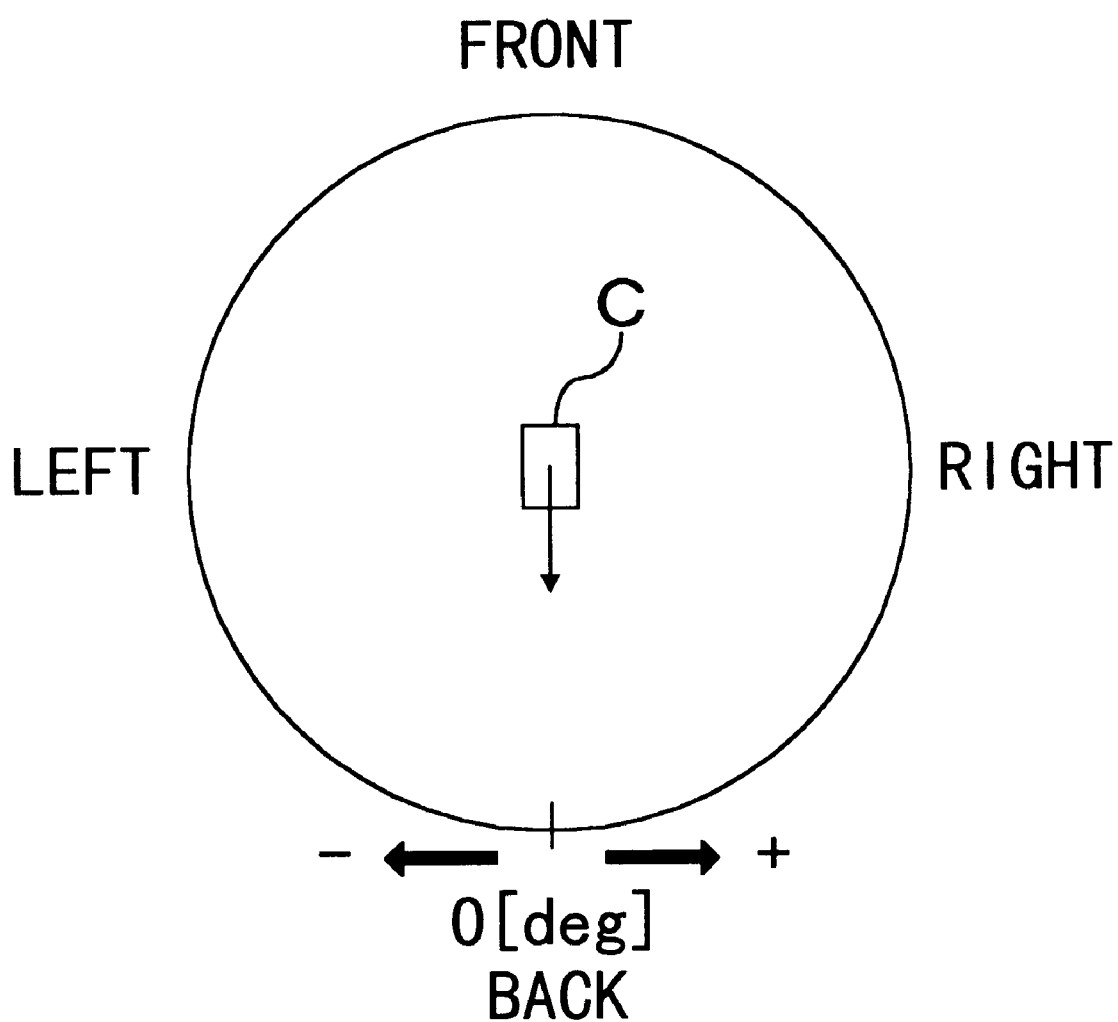
FIG. 27 is a diagram showing the coordinate system of the running direction of the car C used in the embodiment.

Next, the labels of the membership functions must be defined as shown in FIG. 26. The coordinate system of the movement angle of the car C is defined as shown in FIG. 27. Assume that the car C moves into BACK directly, where the right of the car C is represented by RIGHT, the left by LEFT, the front by FRONT, and the back by BACK, respectively. The car C moves directly into the BACK direction. The angle of the car C in relation to the vacant lot LT is 0 degree, the right side of the vacant slot LT is represented by a positive angle (+), and the left side of the vacant lot LT is represented by a negative (−) angle.

Figure 28:
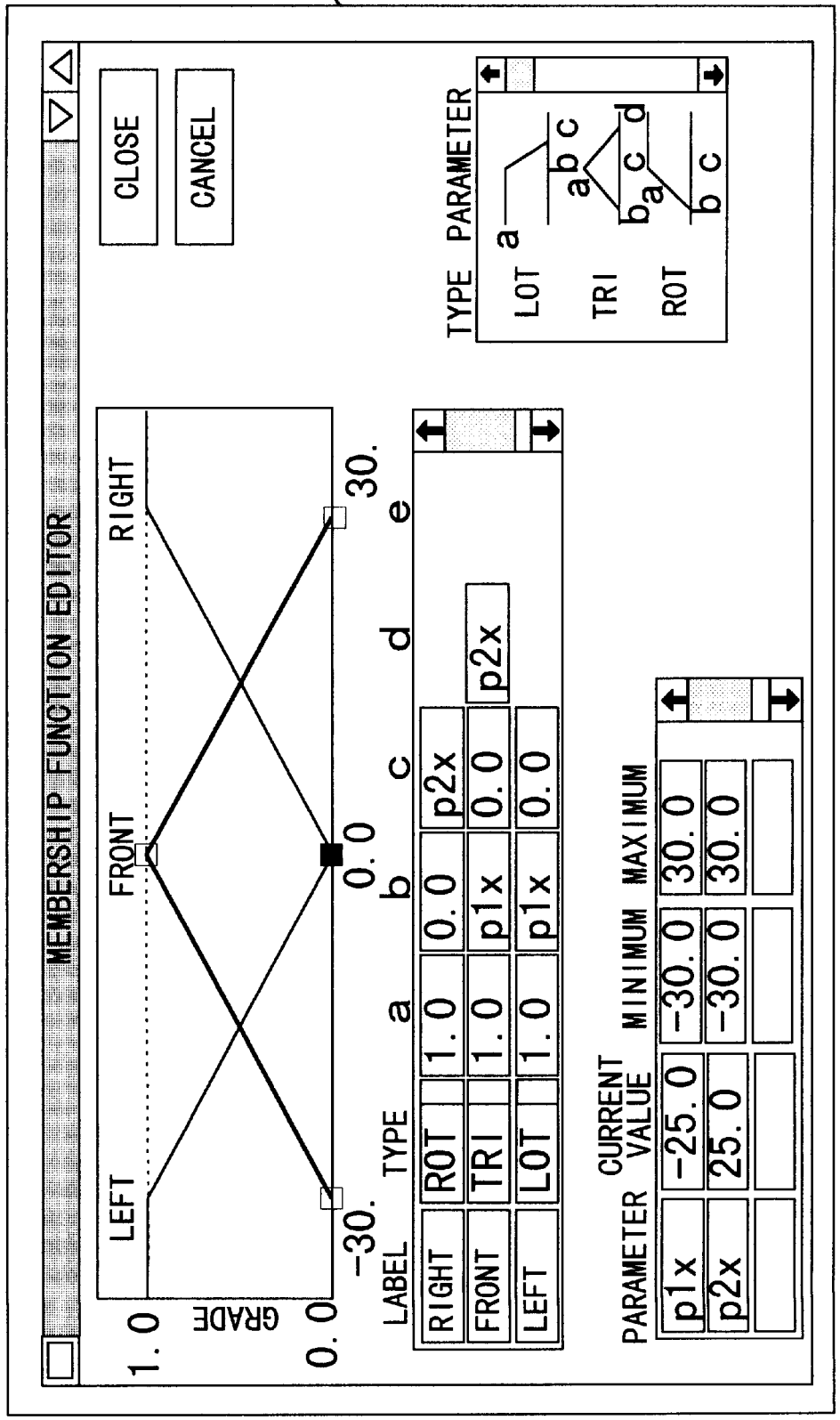
FIG. 28 is a diagram showing an example of screen display of the membership function editor 27 used in the embodiment.
Figure 29:
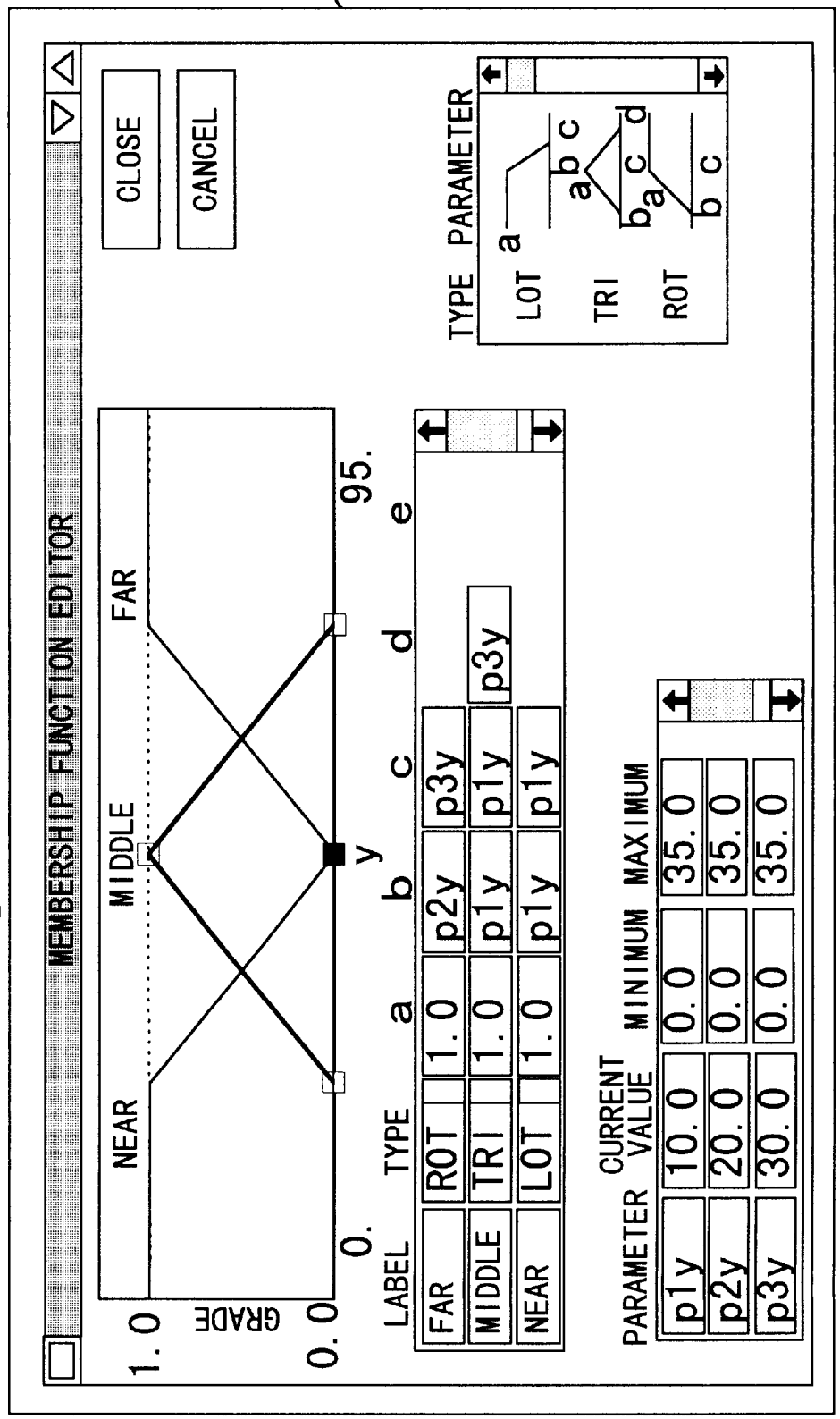
FIG. 29 is a diagram showing an example of screen display of the membership function editor 27 used in the embodiment.

FIGS. 28 and 29 show the screens of the membership function editor 27 representing the triangle type membership functions for the input values $y_1$ and $y_2$. That is, for the input value $y_1$, the membership functions with the labels RIGHT, FRONT, and LEFT are assigned to the ROT type, TRI type, and LOT type functions, respectively, the parameters shown in the figure being specified for each of them, as shown in FIG. 28. Similarly, for the input value $y_2$, the membership functions with the labels FAR, MIDDLE, and NEAR are assigned to the ROT type, TRI type, and LOT type functions, respectively, the parameters shown in the figure being specified for each of them, as shown in FIG. 29.

Figure 30:
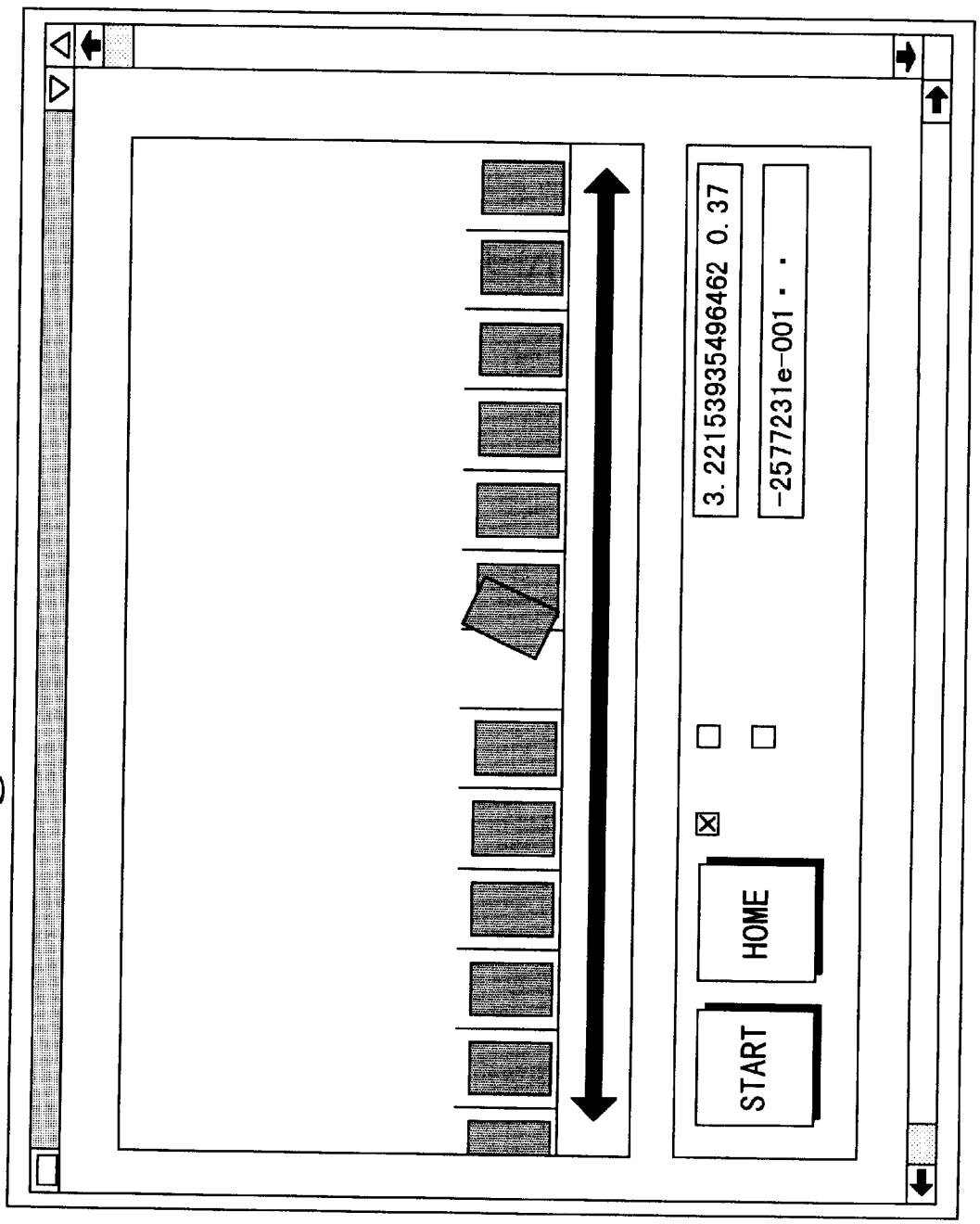
FIG. 30 is an example of display screen, used in the embodiment, indicating the status after the system was executed.

The system, after built as described above, is converted to a program for execution. That is, the movement direction of the car is calculated at each point according to the specified fuzzy rules to guide the car into the vacant lot (forward processing). Note that, at this point, the membership functions are initialized but not yet adjusted. So, the initial position values in FIG. 24 result in the screen shown in FIG. 30. As shown in this figure, the car C is not parked in the vacant lot LT.

Therefore, it is necessary to specify teacher data, consisting of a plurality of pairs $\{y, u\}$, so that the system can learn. This data may be obtained by selecting some positions from those in the coordinate system shown in FIG. 24 and, at each point, by having experienced drivers specify a movement direction. About 200 pieces of teacher data are collected in this manner so that the system can learn.

Figure 32:
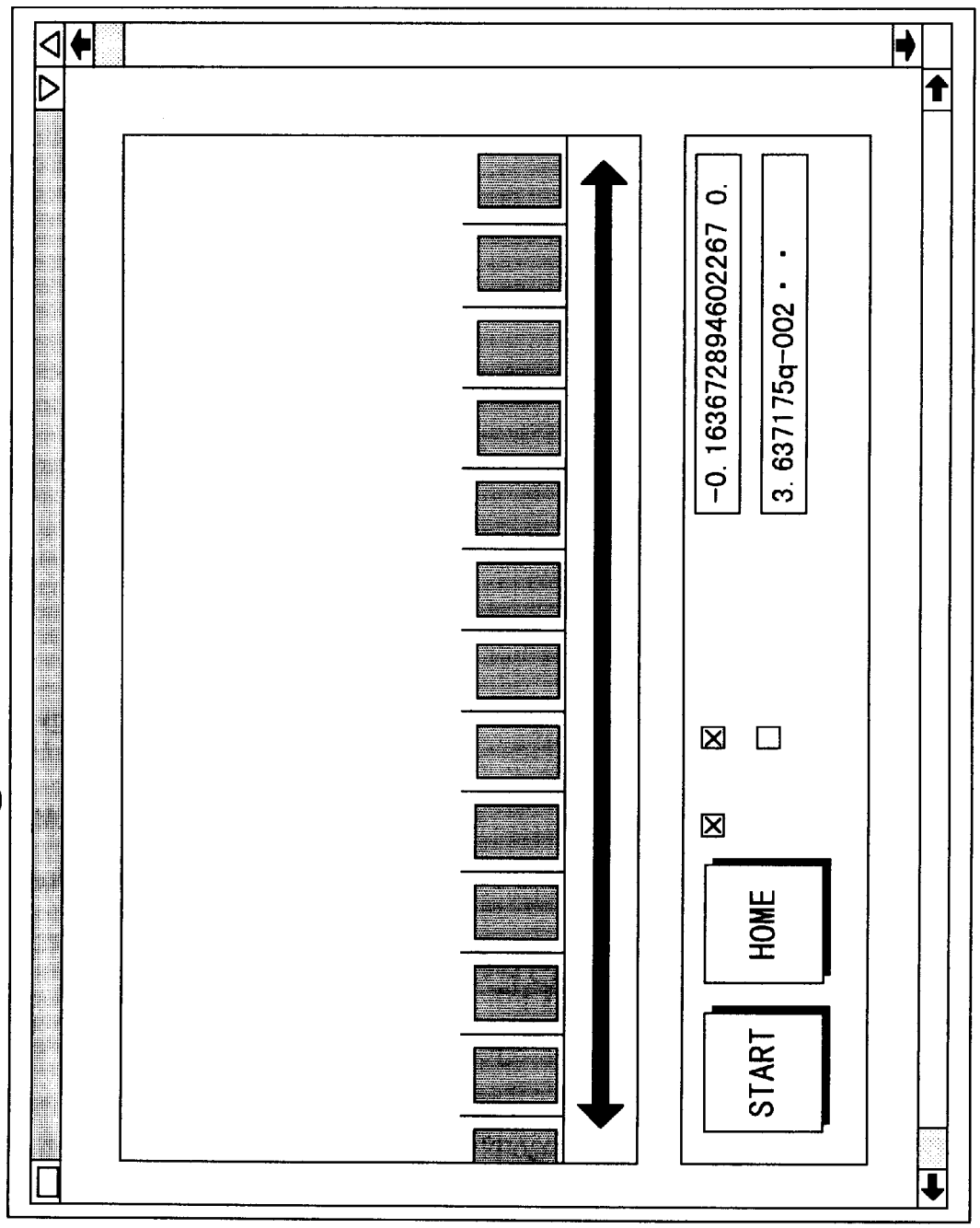
FIG. 32 is a diagram showing an example of screen display indicating the status after the system was executed after learning in the embodiment.
Figure 33:
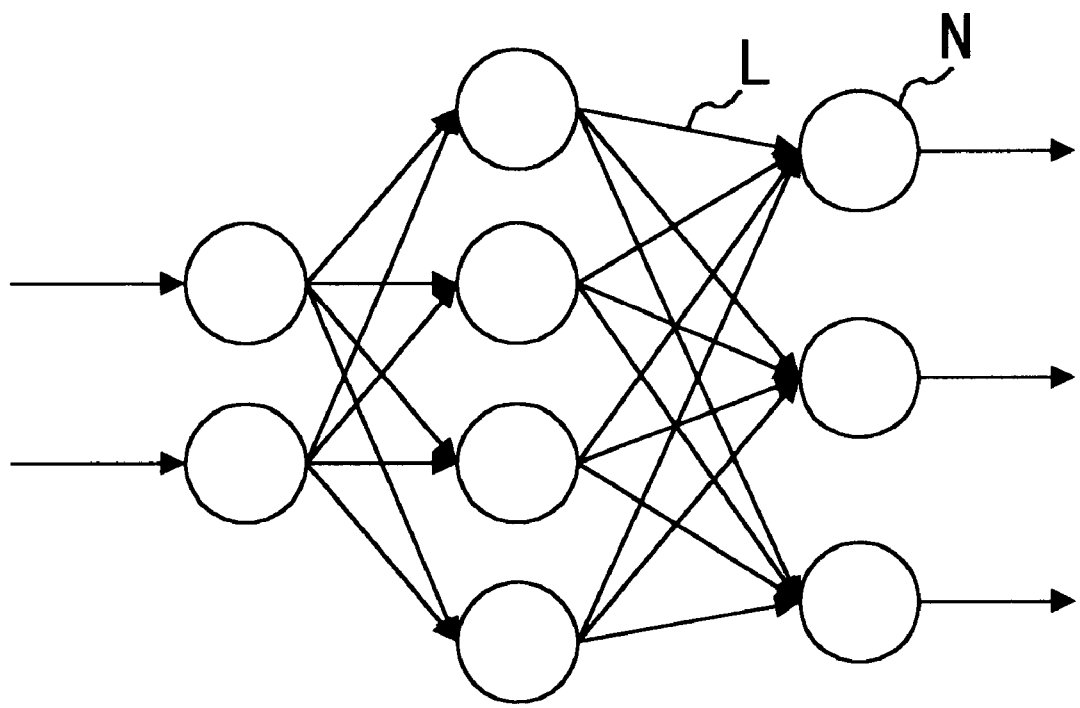
FIG. 33 is a conceptual diagram showing an example of the structure of a traditional neural network.
Figure 34:
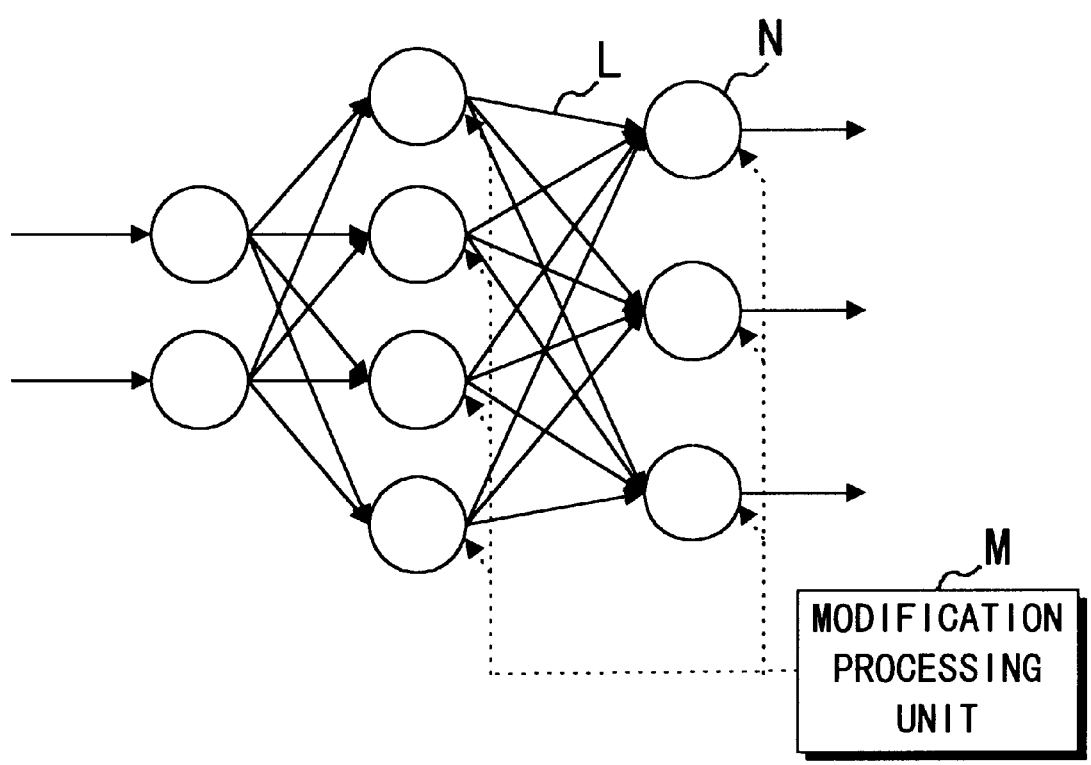
FIG. 34 is a conceptual diagram showing the relationship between a traditional system and the modification processing section M.
Figure 35:
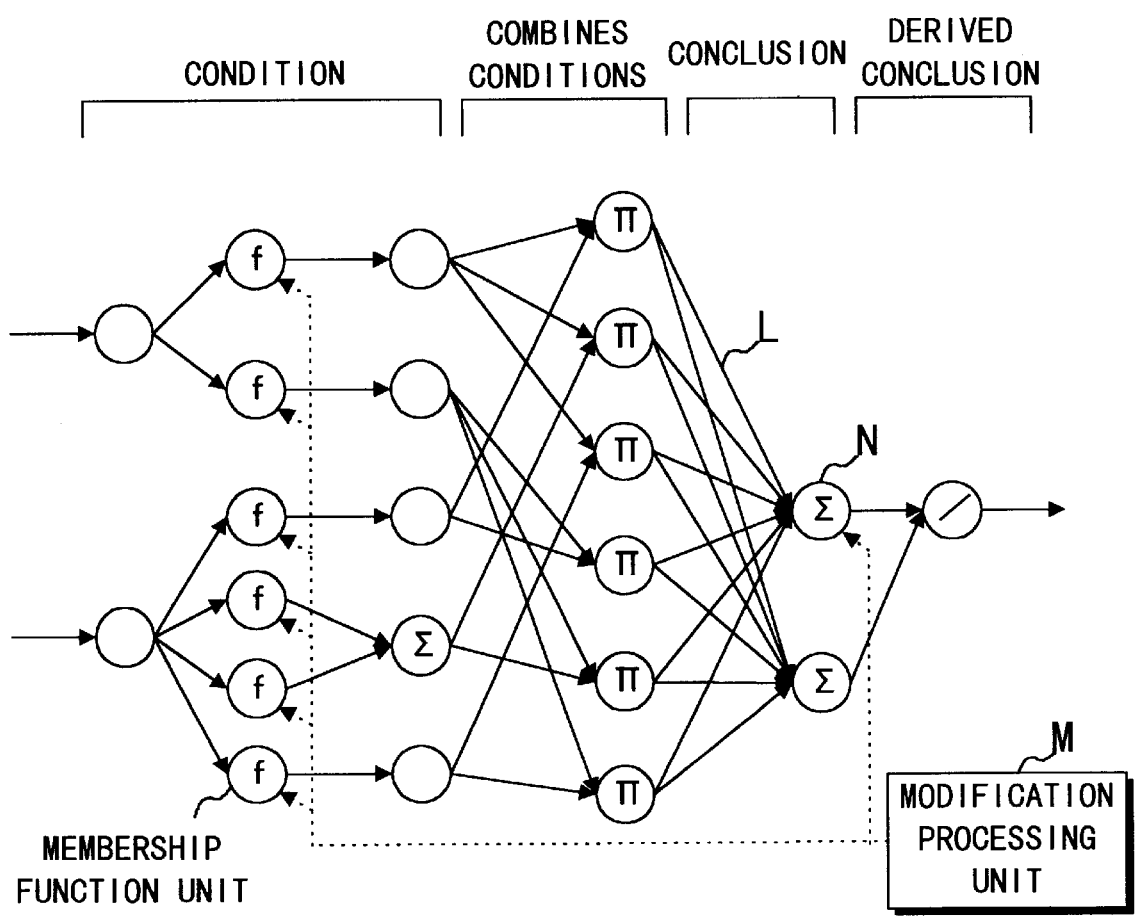
FIG. 35 is a diagram showing the application of a neural network to a fuzzy inference system.

FIG. 31 shows how the membership functions have been modified by performing 1500 times of learning with the use of 200 and more pieces of teacher data. As a result of learning, we can see that the values of constants a, b, c, and d have been changed. FIG. 32 shows the result of execution of the system after learning under the initial condition, indicating that the car C has parked in the vacant lot LT successfully.

As described above, each unit has the learning processing function shown in formulas (3) and (4), eliminating the need for the user to create programs specifically designed for the system to learn. This makes it possible for the user to built the system quickly. In addition, the user can add or change rules after the system is designed simply by adding or exchanging units. This means that the user need not change or modify programs and, therefore, the user can build the system efficiently.

Effects of the Invention

A system according to this invention allows the user to build a system consisting of units each having the parameter modification function. Therefore, the whole system may be built as a collection of processing performed by each unit. Building a system becomes easy because the user need only to connect units. In addition, there is no need for the user to design the learning or modification means after building the system, making the system-built process more efficient.

Another advantage of a system-build system according to this invention is that, because the user can select and connect whatever units he wants, making the system-build process still easier. This reduces the system-build cost and time.

While a preferred embodiment has been described, variations thereto will occur to those skilled in the art within the scope of the present inventive concepts which are delineated by the following claims.

What is claimed is:

1. A data processing system comprising:
   a plurality of data processing units coupled together to form a first layered neural network, the data processing units generating output signals by modifying an input signal according to parameters associated with each of the data processing units and transmitting the output signal in an upstream direction through the layered network, the data processing units transmitting error signals in a downstream direction through the layered network, each said data processing unit further including
   modification means for modifying said parameters of the data processing unit based on the received error signal, the received error signals being based on a difference between a final output signal of the network and a desired output signal, and
   at least one of the data processing units further comprising
      a second plurality of data processing units coupled together to form a second layered neural network, wherein the first and second layered networks form a hierarchy of networks in which the second layered network is subordinate to the first layered network, and wherein the first and second layered networks each further include a unit control means for controlling an operating sequence of data processing units within each layered network.

2. The data processing system of claim 1, wherein the modification means further comprises means for generating a new error signal based on the received error signal.

3. The data processing system of claim 1, wherein the data processing units each further comprise:

control means for controlling the operation of the data processing unit, the control means of data processing units in a subordinate network controlling the operation of the data processing units in the subordinate network based on an operation instruction transmitted from the unit control means of a superordinate network.

* * * * *